(12) United States Patent
Kawaguchi et al.

(10) Patent No.: US 7,231,646 B2
(45) Date of Patent: Jun. 12, 2007

(54) DISK-DRIVE DEVICE

(75) Inventors: Mitsuyoshi Kawaguchi, Kanagawa (JP); Naoki Inoue, Kanagawa (JP); Hiroaki Mizuma, Tokyo (JP); Takuji Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 528 days.

(21) Appl. No.: 10/433,070

(22) PCT Filed: Oct. 1, 2002

(86) PCT No.: PCT/JP02/10230

§ 371 (c)(1),
(2), (4) Date: Nov. 10, 2003

(87) PCT Pub. No.: WO03/032310

PCT Pub. Date: Apr. 17, 2003

(65) Prior Publication Data

US 2005/0229194 A1 Oct. 13, 2005

(30) Foreign Application Priority Data

Oct. 1, 2001 (JP) .............................. 2001-305593

(51) Int. Cl.
*G11B 17/04* (2006.01)
(52) U.S. Cl. ..................................................... 720/630
(58) Field of Classification Search ................. 720/741, 720/742, 744, 745, 630; 369/291
See application file for complete search history.

(56) References Cited

U.S. PATENT DOCUMENTS

| 4,792,872 | A | 12/1988 | Nakanishi et al. | |
| 5,570,342 | A | 10/1996 | Kosaka | |
| 6,477,138 | B1 * | 11/2002 | Cho et al. | 720/742 |
| 6,590,858 | B2 * | 7/2003 | Inoue | 720/742 |
| 2002/0118634 | A1 * | 8/2002 | Khuu | 369/291 |
| 2003/0058785 | A1 * | 3/2003 | Kurosawa | 369/291 |

FOREIGN PATENT DOCUMENTS

| EP | 1 156 488 | 11/2001 |
| EP | 1 400 974 | 3/2004 |
| EP | 1 426 960 | 6/2004 |
| JP | 58-111148 | 7/1983 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

A disc drive unit capable of simply performing an opening and closing driving of shutters by rotation of an inner rotor of a disc cartridge using the inner rotor is provided. A disc drive unit is constituted so as to open and close shutters (9, 10) by rotationally driving a partial gear (27) of the inner rotor (4) by a rack portion (74) of a rack member (71) slidably driving it relative to a disc cartridge (1).

3 Claims, 44 Drawing Sheets

VIEW A-A

VIEW A-A

DISK-DRIVE DEVICE

TECHNICAL FIELD

The present invention relates to the technical field of disc drive units into which disc cartridges housing or replaceably housing and using disc recording media, such as a DVR, DVD, DVD-ROM and the like, are loaded and, more particularly, to the technical field of drive mechanisms for opening and closing shutters on disc cartridges.

BACKGROUND ART

Heretofore, as shown in FIG. 44, a disc cartridge 101, such as a DVR, DVD, DVD-ROM and the like, has been constituted such that it rotatably houses a disc D between upper and lower shells 102 and 103, and a pair of upper and lower pick-up insertion slots 104 are opened and closed from the upper side of the upper and lower shells 102 and 103 by a substantially U-shaped shutter 105, and the shutter 105 is slid along one side surface 101a of the disc cartridge 101.

However, in such a conventional disc cartridge 101, there has been a problem in that, because the shutter 105 is attached outside, this shutter can be so easily slid and opened that the disc D housed inside may become damaged or dust and the like may adhere to the disc D, thereby making dropouts likely during writing and/or recording of a data.

The present invention has been made in order to solve the above-described problem, and an object of the invention is to provide a disc drive unit in which opening and closing driving of the shutter by rotation of an inner rotor in the disc cartridge can be simply performed, the pick-up insertion slot being opened and closed by means of the shutter, from the inside by rotation of the inner rotor in which a disc-shaped recording medium is housed so that the shutter is not easily opened from the outside.

DISCLOSURE OF THE INVENTION

A disc drive unit of the present invention for achieving the above-described object is characterized in that it is a disc drive unit which writes to and/or reads from a disc-shaped recording medium rotatably housed inside a disc cartridge comprising a rotatably-housed inner rotor and a shutter for closing and opening a pick-up insertion slot, from the inside, by rotation of the inner rotor, the disc drive unit, comprising:

a rack member having a rack portion to engage with an outer peripheral gear formed on an outer periphery of the inner rotor; and driving means for slidably driving the rack portion relative to the disc cartridge so as to rotationally drive the outer peripheral gear.

The disc drive unit of the present invention, constituted as described above, can simply perform opening and closing driving of the shutter by rotation of the inner rotor in the disc cartridge, which opens and closes a pick-up insertion slot, from the inside, by means of the shutter by rotation of the inner rotor, in which a disc-shaped recording medium is housed, by the rack member which is slidably driven relative to the disc cartridge and is rotationally driven on the outer peripheral gear of the inner rotor.

BEST MODE FOR CARRYING OUT THE INVENTION

Hereinafter, embodiments of a disc cartridge and a disc drive unit, to which the present invention is applied, will be described in the following order with reference to FIGS. 1 to 43:

(1) An explanation of an operation for rotationally driving an inner rotor in a disc drive unit by a rack member between a shutter opening and closing start position and a shutter opening and closing termination position (FIGS. 1 to 9).

Figure 11:
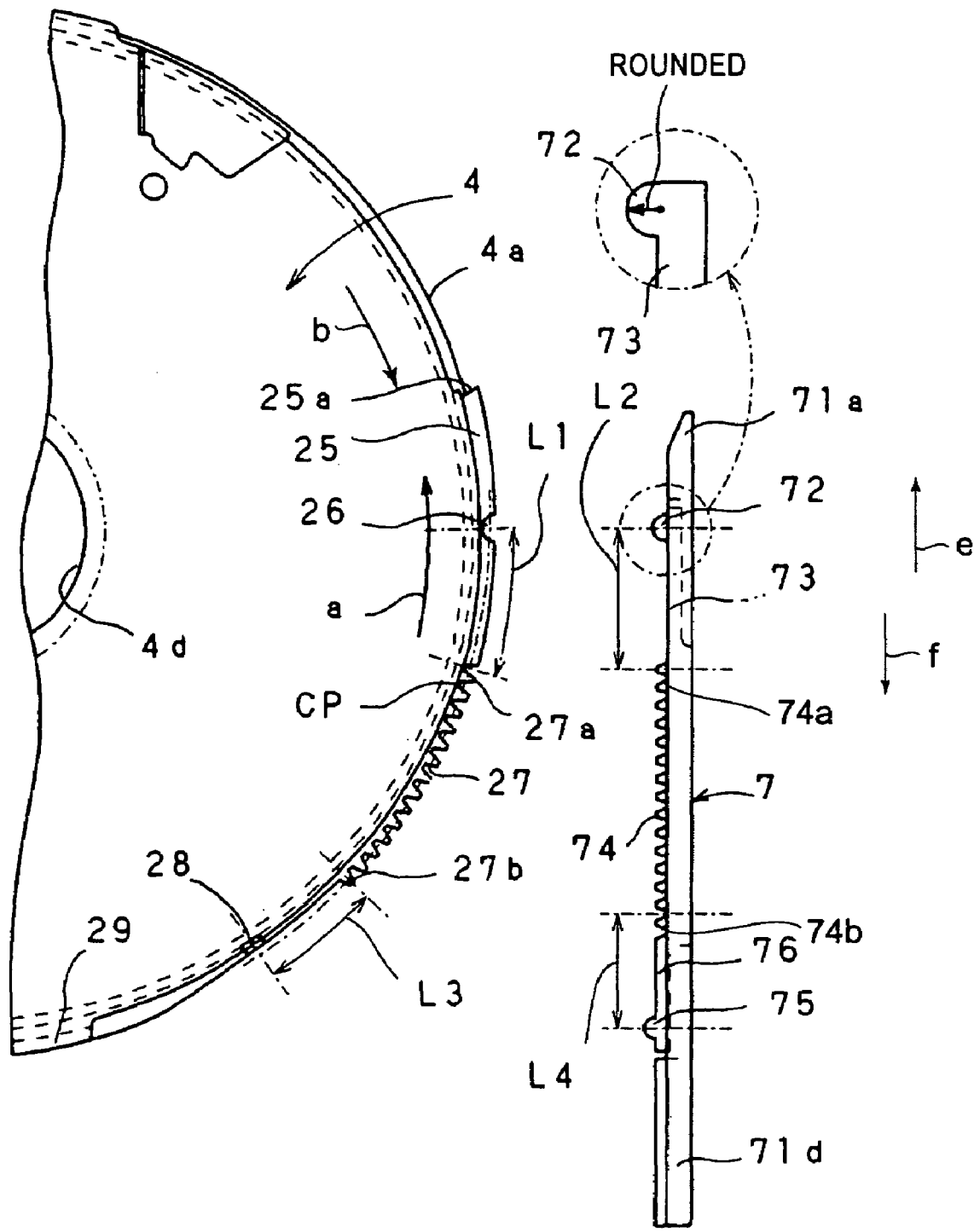
FIG. 11 is a bottom view explaining the physical relationship between a shutter opening and closing start concave portion and a shutter opening and closing termination concave portion of the inner rotor for a partial gear, and the physical relationship between shutter opening and closing start convex portion and a shutter opening and closing termination convex portion of a rack member and a rack portion.
Figure 12:
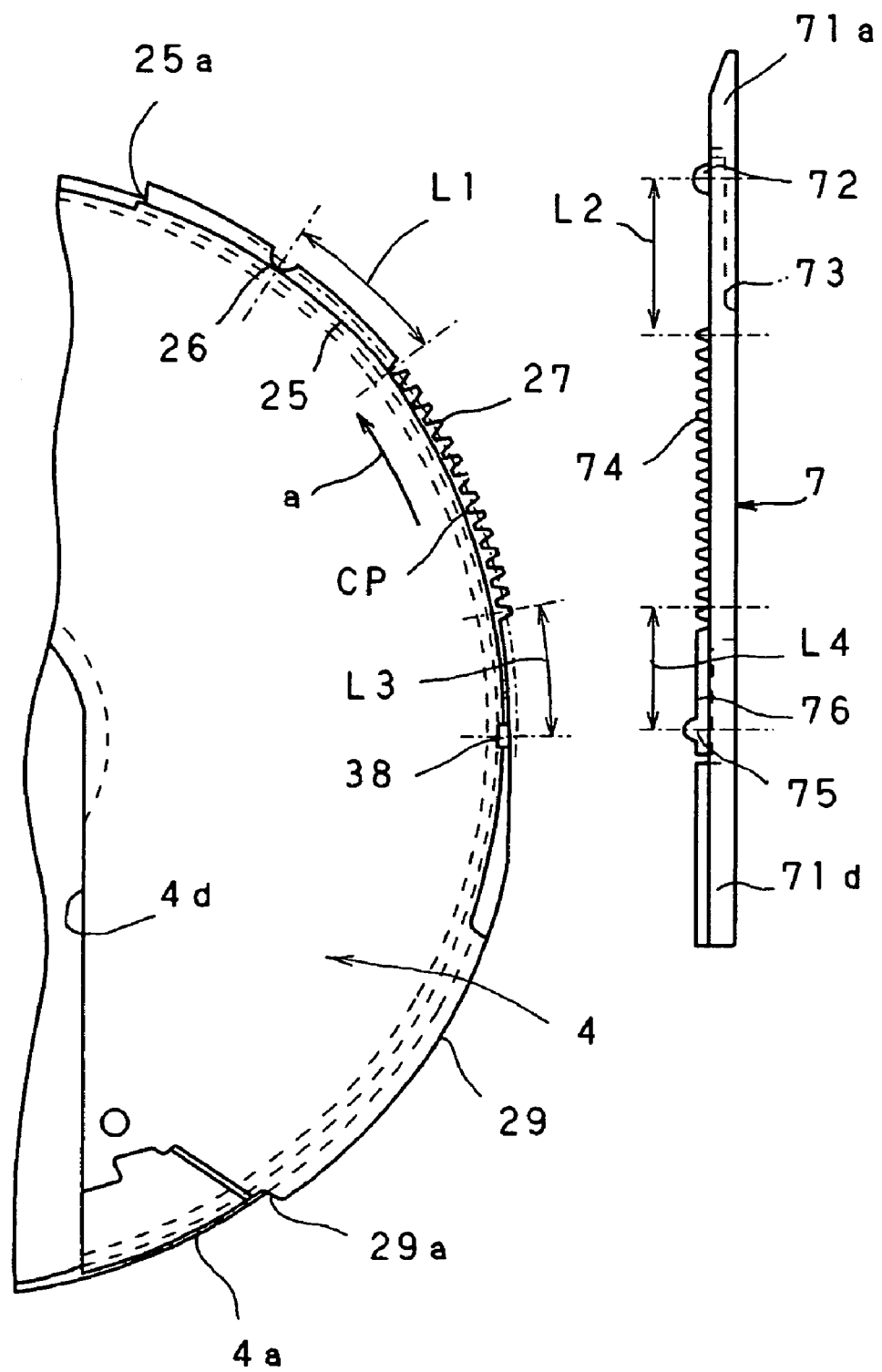
FIG. 12 is a bottom view, which is same as FIG. 11.

(2) An explanation regarding the relative relationship between a shutter opening and closing start concave portion of the outer periphery of the inner rotor, a partial gear and a shutter opening and closing termination concave portion, and the relative relationship between a shutter opening and closing start convex portion of a rack member, a rack portion, and a shutter opening and closing termination convex portion (FIGS. 11 and 12).

(3) An explanation regarding a reference surface for the rack member formed by the side surface of the disc cartridge (FIGS. 13 to 16).

(4) An explanation regarding a support mechanism of the shutter opening and closing start convex portion and the shutter opening and closing termination convex portion of the rack member (FIGS. 17 to 20).

(5) An explanation regarding the disc cartridge using the inner rotor (FIG. 21 to FIG. 24).

(6) An explanation regarding a shutter opening and closing mechanism, which is opened and closed by rotation of the inner rotor (FIG. 25 to FIG. 32).

Figure 34:
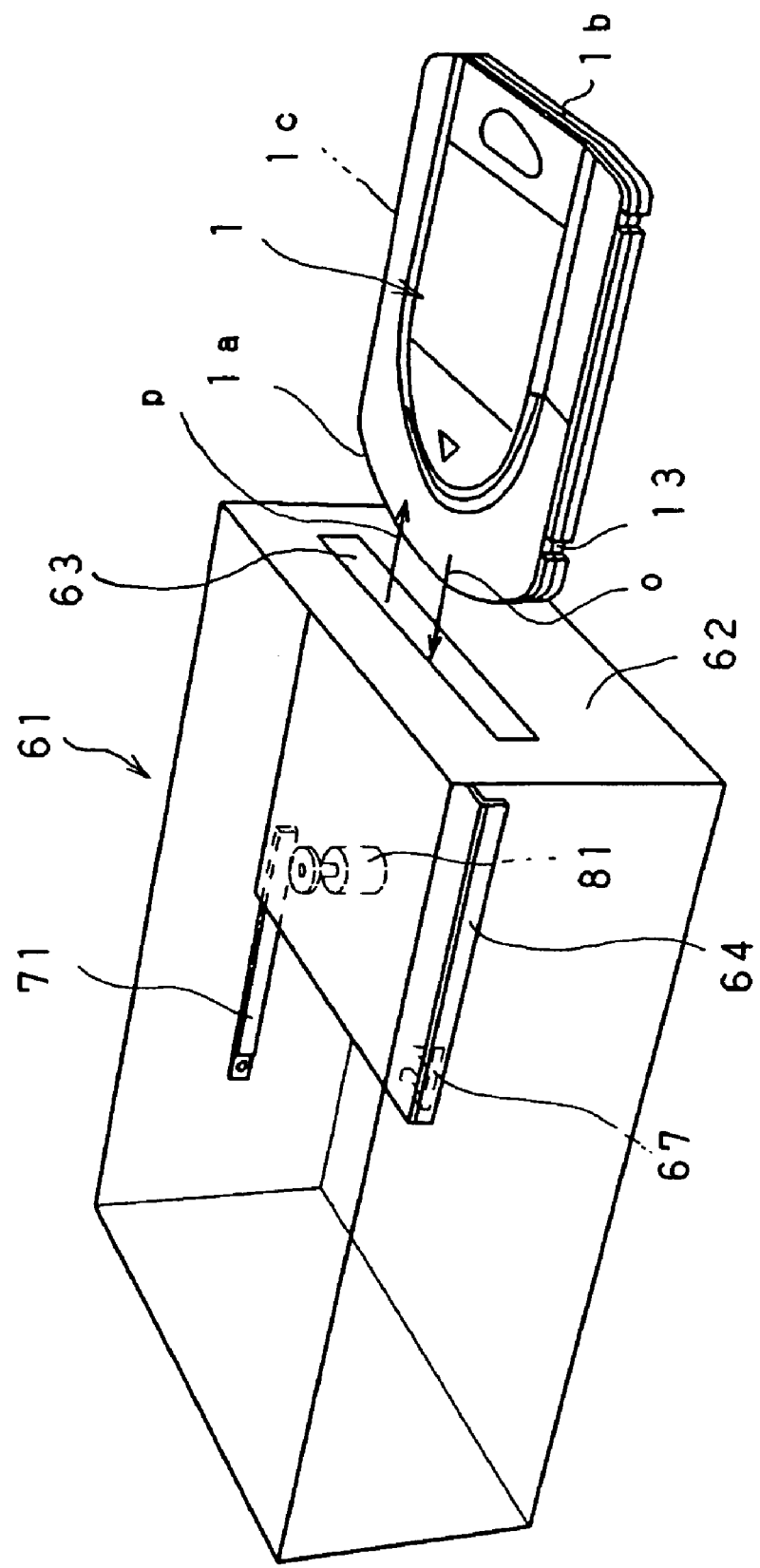
FIG. 34 is a see-through perspective view, showing an initial state of a first example of a sliding driving method of the rack member, which performs shutter opening and closing driving of the disc cartridge.
Figure 35:
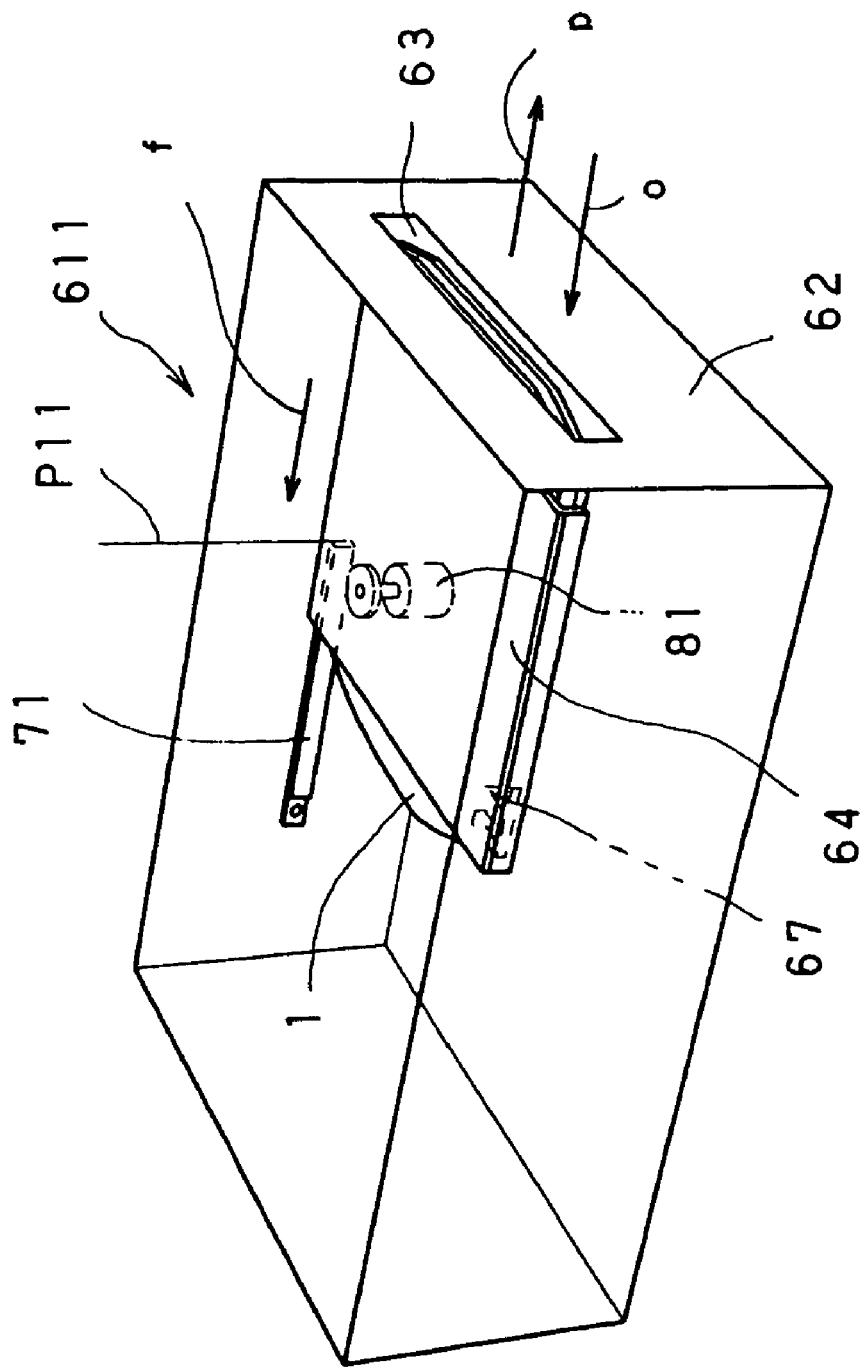
FIG. 35 is a see-through perspective view, showing a second example of the sliding driving method of the rack member subsequent to the state shown in FIG. 34.
Figure 36:
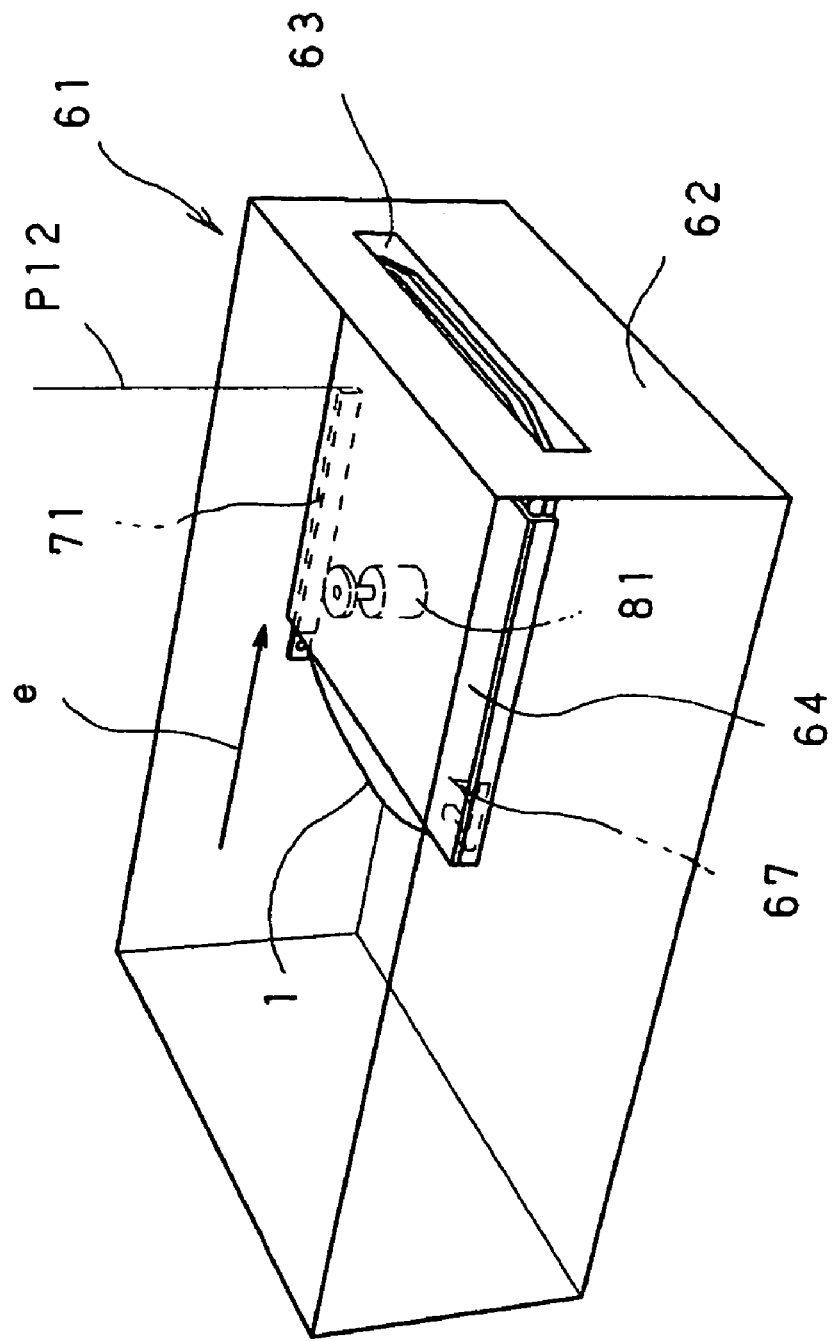
FIG. 36 is a see-through perspective view, showing a second example of the sliding driving method of the rack member subsequent to the state shown in FIG. 34.

(7) An explanation regarding a first example of a sliding driving method of the rack member in the disc drive unit for the disc cartridge (FIGS. 34 to 36).

(8) An explanation regarding a second example of the sliding driving method of the rack member in the disc drive unit for the disc cartridge (FIGS. 37 to 40).

Figure 41:
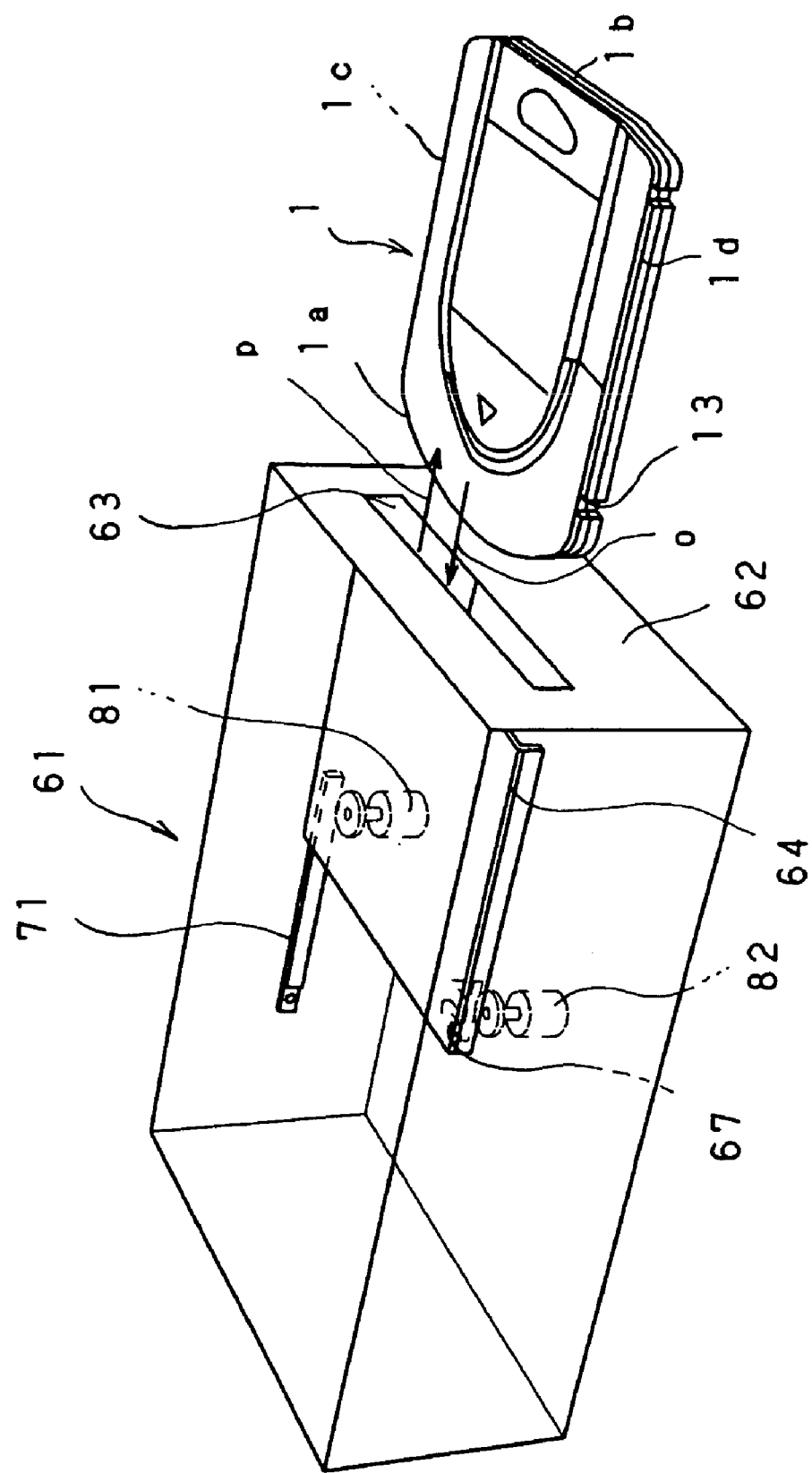
FIG. 41 is a see-through perspective view, showing a third example of the relative sliding driving method of the disc cartridge and the rack member which performs shutter opening and closing driving of the disc cartridge.
Figure 42:
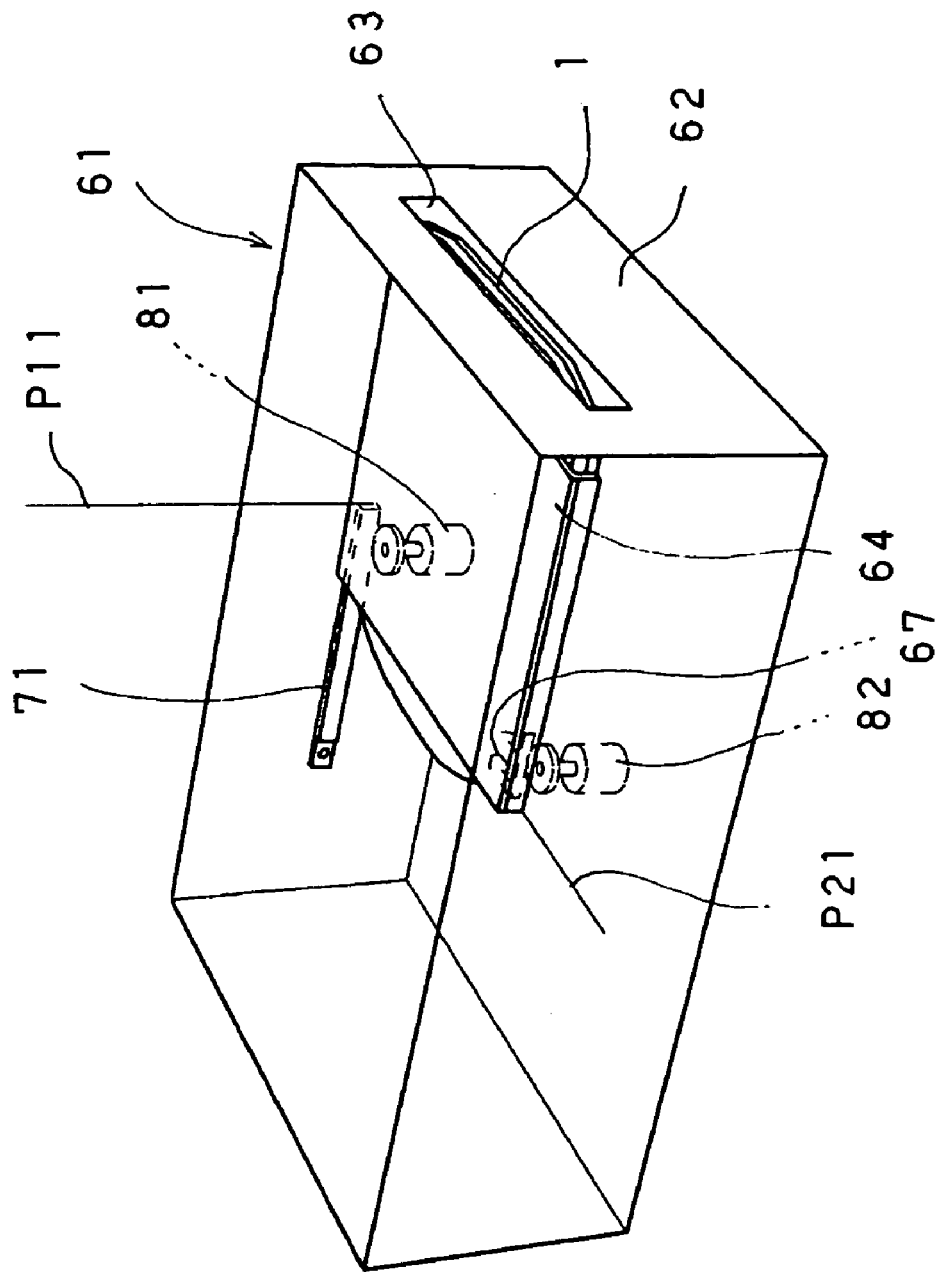
FIG. 42 is a see-through perspective view, showing the third example of the relative sliding driving method of the rack member for the disc cartridge subsequent to the state shown in FIG. 41.
Figure 43:
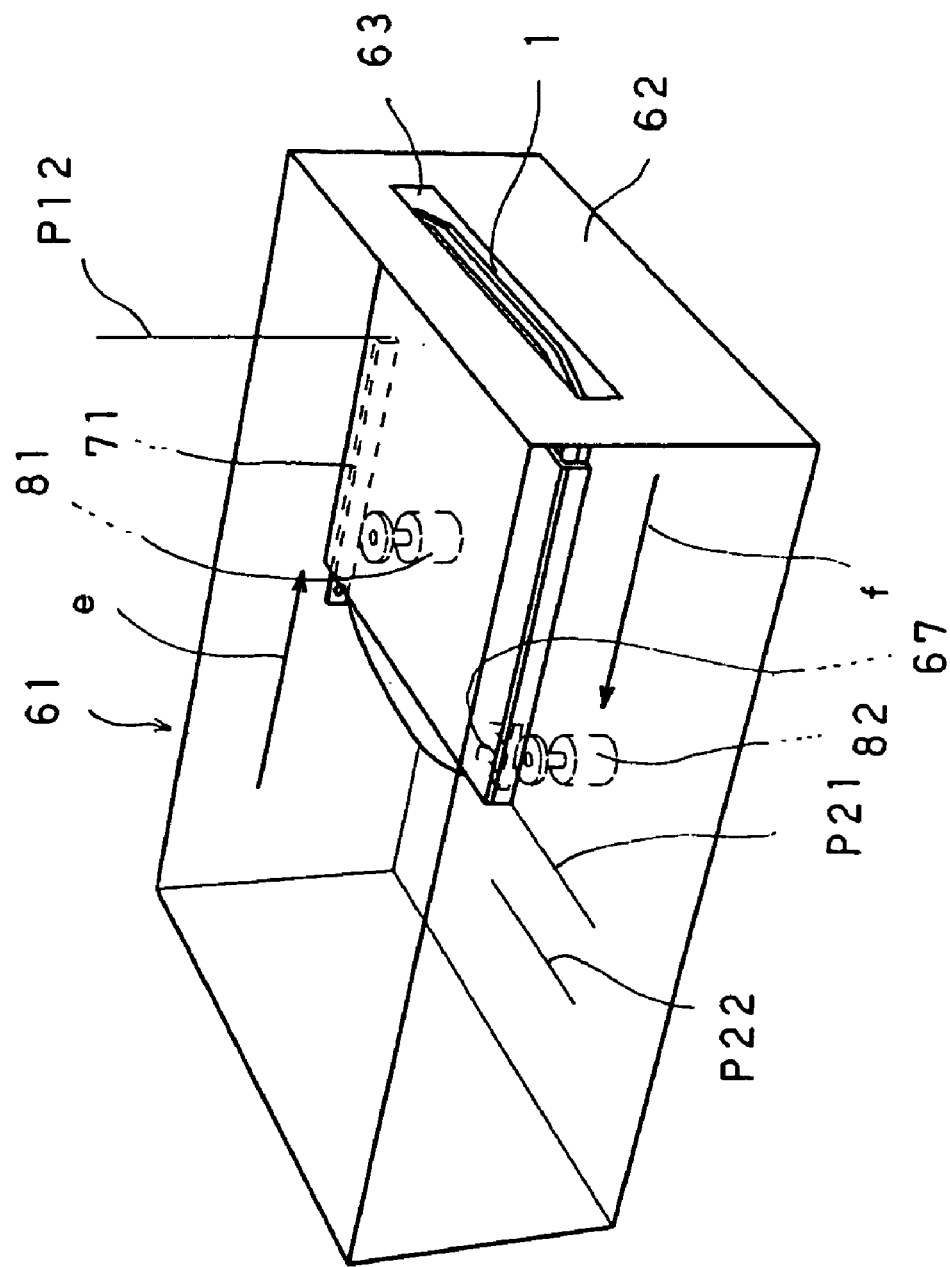
FIG. 43 is a see-through perspective view, showing the third example of the relative sliding driving method of the rack member of the disc cartridge subsequent to the state shown in FIG. 42.
Figure 44:
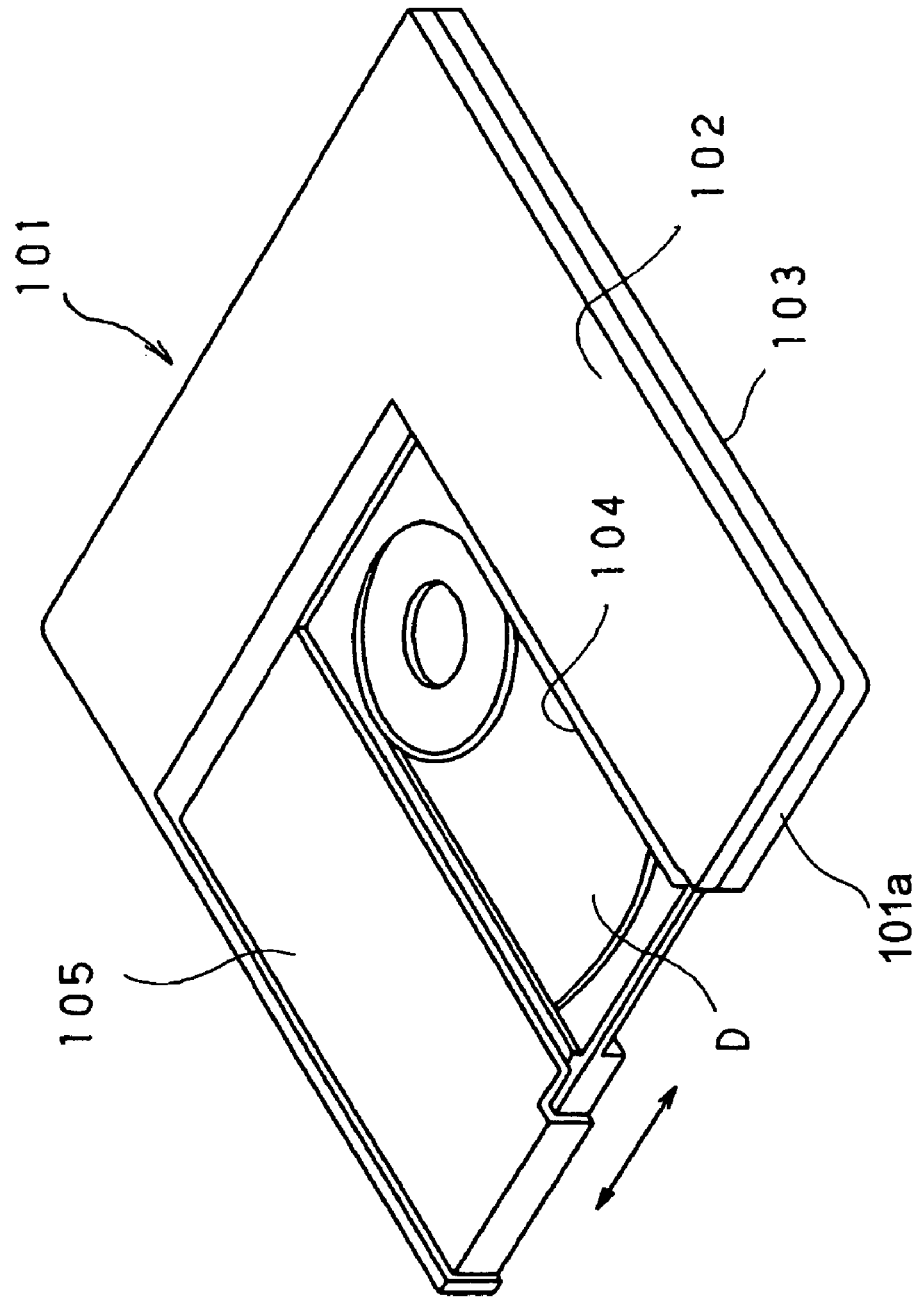
FIG. 44 is a perspective view of a conventional disc cartridge.

(9) An explanation regarding a third example of the sliding driving method of the rack member in the disc drive unit for the disc cartridge (FIGS. 41 to 43).

(1) Explanation of an Operation for Rotationally Driving an Inner Rotor in a Disc Drive Unit by a Rack Member Between a Shutter Opening and Closing Start Position and a Shutter Opening and Closing Termination Position First, referring to FIGS. 1 to 9, the operation for rotationally driving the inner rotor of a disc cartridge to be described later by the rack member of a disc drive unit to be described later from the shutter opening and closing start position shown in FIG. 1 to the shutter opening and closing termination position shown in FIG. 9 will be described.

Figure 1:
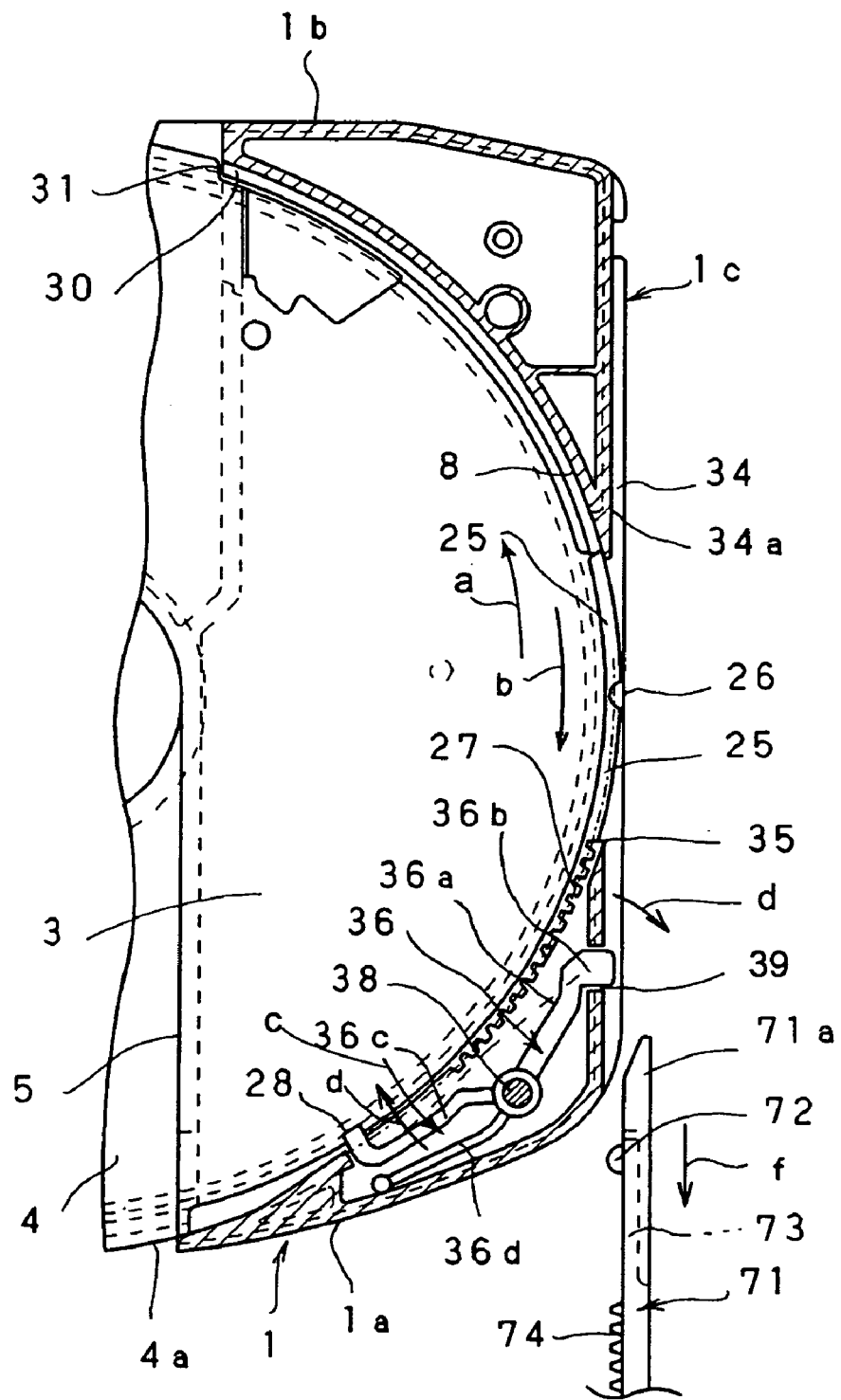
FIG. 1 is a partially cut-away bottom view of an initial state explaining an operation for rotationally driving an inner rotor by a rack member in an embodiment of a disc cartridge and a disc drive unit, to which the present invention is applied.

First, in FIG. 1, the arrow direction a is the rotational direction for opening a shutter of the inner rotor 4, and the arrow direction b is the rotational direction for closing the shutter.

FIG. 1 shows an initial state in which the inner rotor 4 has been restored to the shutter opening and closing start position in the arrow b direction, and is locked by a locking member 36.

At this time, a shutter opening and closing start convex portion 25, which is a circular arc-shaped convex portion integrally formed in a circular-arc shape on an outer peripheral surface 4a of the inner rotor 4, protrudes inside a concave groove 34 in a circular arc shape through a rectangular-shaped window hole 35, which is opened almost at the center position in the longitudinal direction of a bottom portion 34a of the concave groove 34 formed in one side surface 1c of the disc cartridge 1, and the window hole 35 is blocked by this shutter opening and closing start convex portion 25. A shutter opening and closing start concave portion 26, which is formed at a rotation start portion in the inner rotor 4 almost at the center position in the circumferential direction of the shutter opening and closing start convex portion 25, is positioned almost at the center position in the longitudinal direction of the window hole 35.

A partial gear 27, which is an outer peripheral gear integrally formed in a circular arc shape in the arrow b direction side from the shutter opening and closing start convex portion 25 on the outer periphery 4a of the inner rotor 4, is retracted into a position at the arrow b direction side in the disc cartridge 1 from the window hole 35 and is to be concealed.

Further, the locking member 36 locks a shutter opening and closing termination concave portion 28, serving as a locking concave portion, formed at a position shifted by a certain distance in the arrow b direction from the partial gear 27 on the outer peripheral surface 4a of the inner rotor 4. Note that this locking member 36 is a substantially Y-shaped molded part formed of synthetic resin and the like, and is rotatably attached in directions indicated by arrows c, d around a support pin 38, which is integrally formed at a position adjacent to the outer periphery of the inner rotor 4 inside a lower shell 3. A top end 36b of a release arm 36a of this locking member 36 protrudes inside the concave groove 34 from the arrow d direction at the bottom portion 34a of the concave groove 34 through a hole 39 formed at a position shifted toward a front surface 1a side from the window hole 35. A locking arm 36c, which is at the side opposite to the locking release arm 36a of this locking member 36 and is formed almost in a fork-shape, is engaged with the shutter opening and closing termination concave portion 28 of the inner rotor 4 by a weak force from a molded spring 36d, and locks the inner rotor 4.

Figure 26:
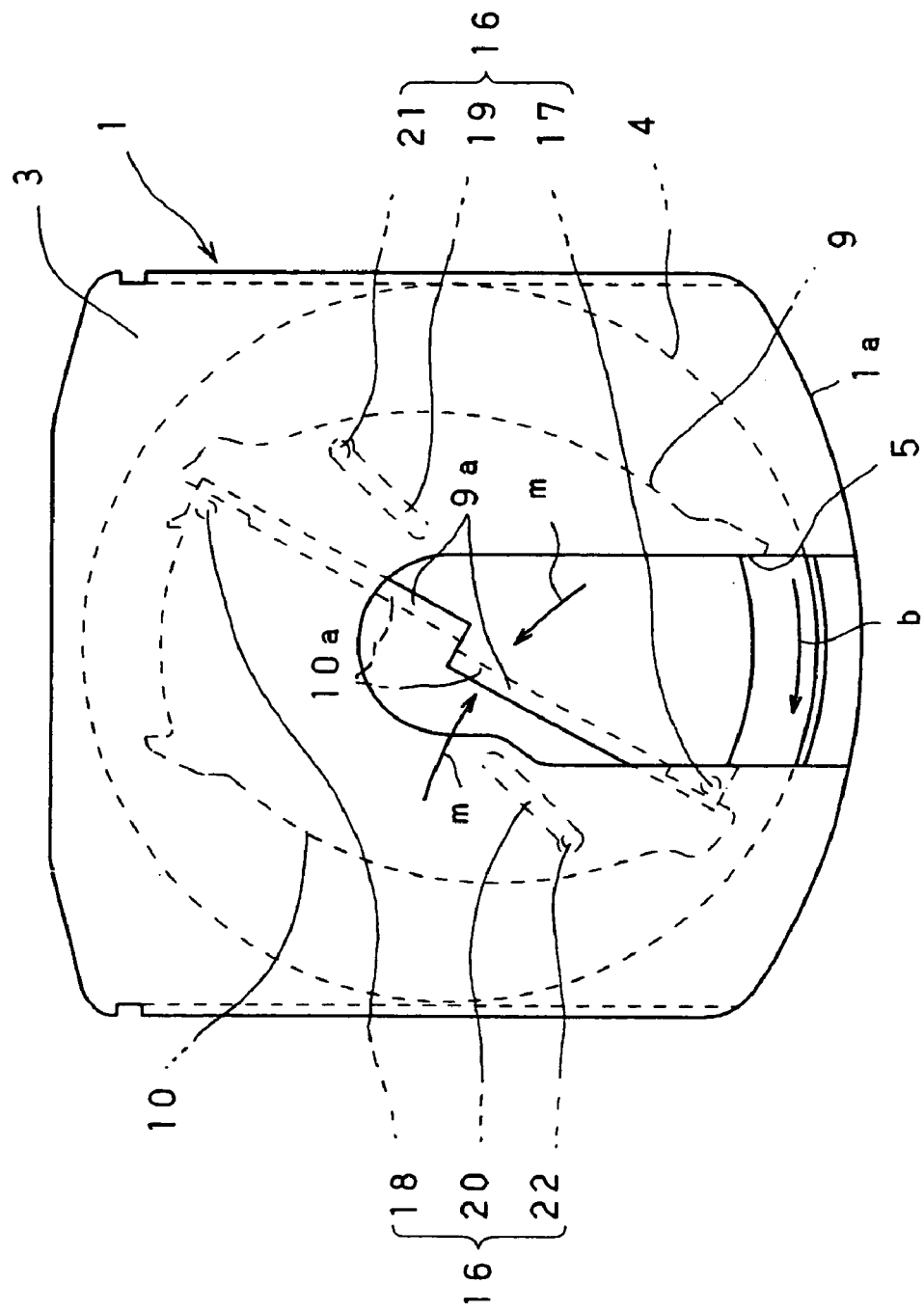
FIG. 26 is a bottom view showing a closed shutter state of a pick-up insertion slot of the disc cartridge.

Hence, in this initial condition, as will be described later with reference to FIGS. 22 and 26, a pick-up insertion slot 5 of the disc cartridge 1 is blocked from the inside by a pair of shutters 9 and 10, and the partial gear 27 of the outer periphery of the inner rotor 4, which drives the shutters 9 and 10, is concealed inside the disc cartridge 1 and, therefore, even if the locking of the inner rotor 4 is released by pushing the locking release arm 36a of the locking member 36 with fingers in the arrow c direction, the shutters 9 and 10 cannot be opened by operating the partial gear 27 with the fingers from the outside of the disc cartridge 1 so as to rotate the inner rotor 4.

Next, FIGS. 2 to 9 show a state in which a rack member 71, which functions as inner rotor rotation driving means provided inside the disc drive unit to be described later, is relatively slidably driven, in the arrow e direction along the side surface 1c of the disc cartridge 1.

Figure 2:
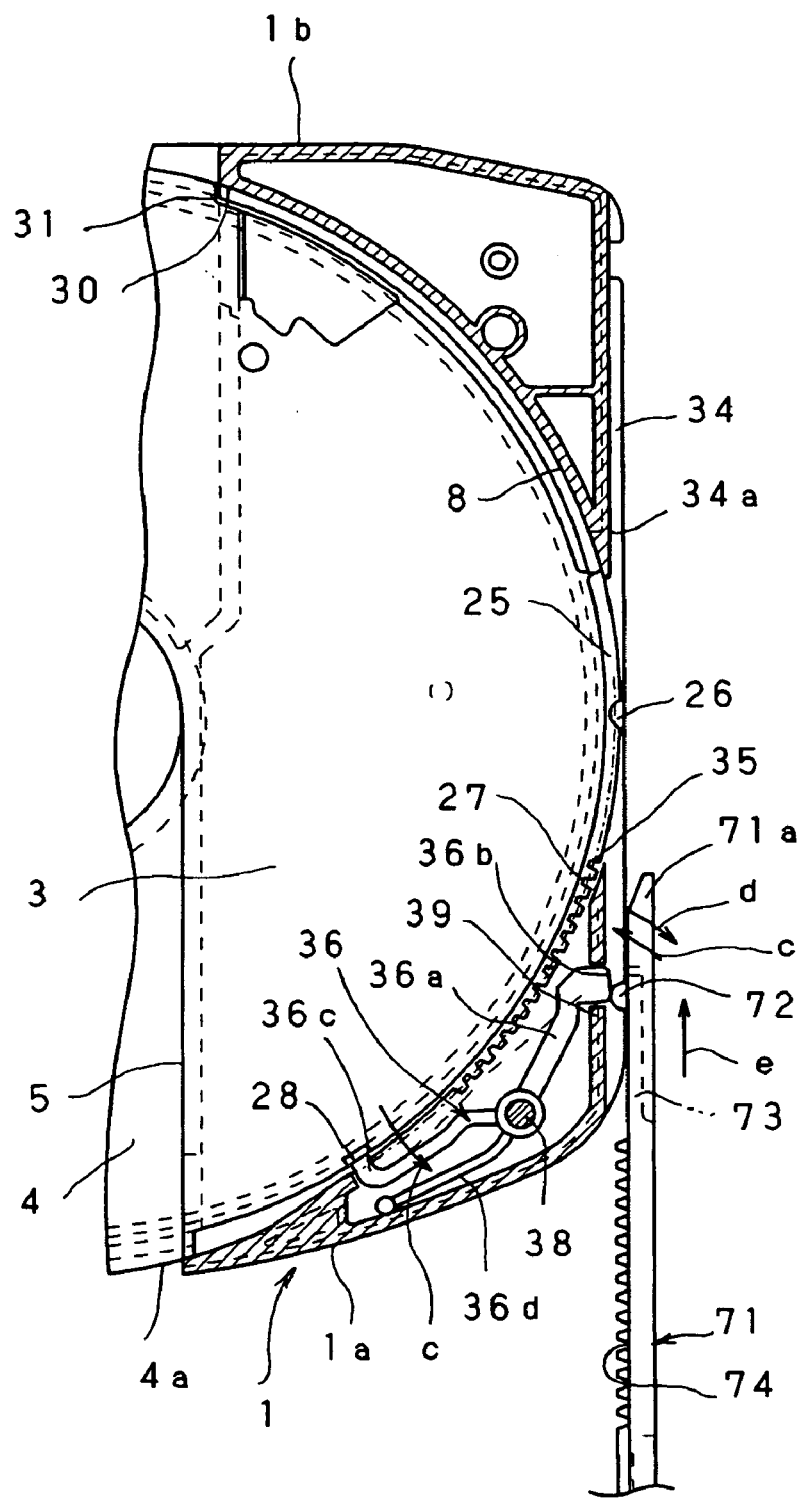
FIG. 2 is a partially cut-away bottom view showing a start of rotational driving of the inner rotor from the initial state shown in FIG. 1.

As shown in FIG. 2, when the rack member 71 is slidably driven in the arrow e direction to a predetermined position for the disc cartridge 1, a shutter opening and closing start convex portion 72 at a top end 71a, which is an inner rotor rotation drive start portion of the rack member 71, pushes the top end 36b of the locking release arm 36a in the arrow c direction. Then, the locking arm 36c of this locking member 36 is rotated in the arrow c direction by pushing against a molded spring 36d, and is separated from the shutter opening and closing termination concave portion 28 of the inner rotor 4, and thus the locking of the inner rotor 4 is released.

Next, when the rack member 71 is continuously slidably driven in the arrow e direction, the shutter opening and closing start convex portion 72 is displaced from the top end 36b of the locking release arm 36a in the arrow e direction, and the top end 36b of the locking release arm 36a of the locking member 36 again protrudes inside the concave groove 34 from the hole 39 in the arrow d direction due to the spring force of the molded spring 36d.

Figure 3:
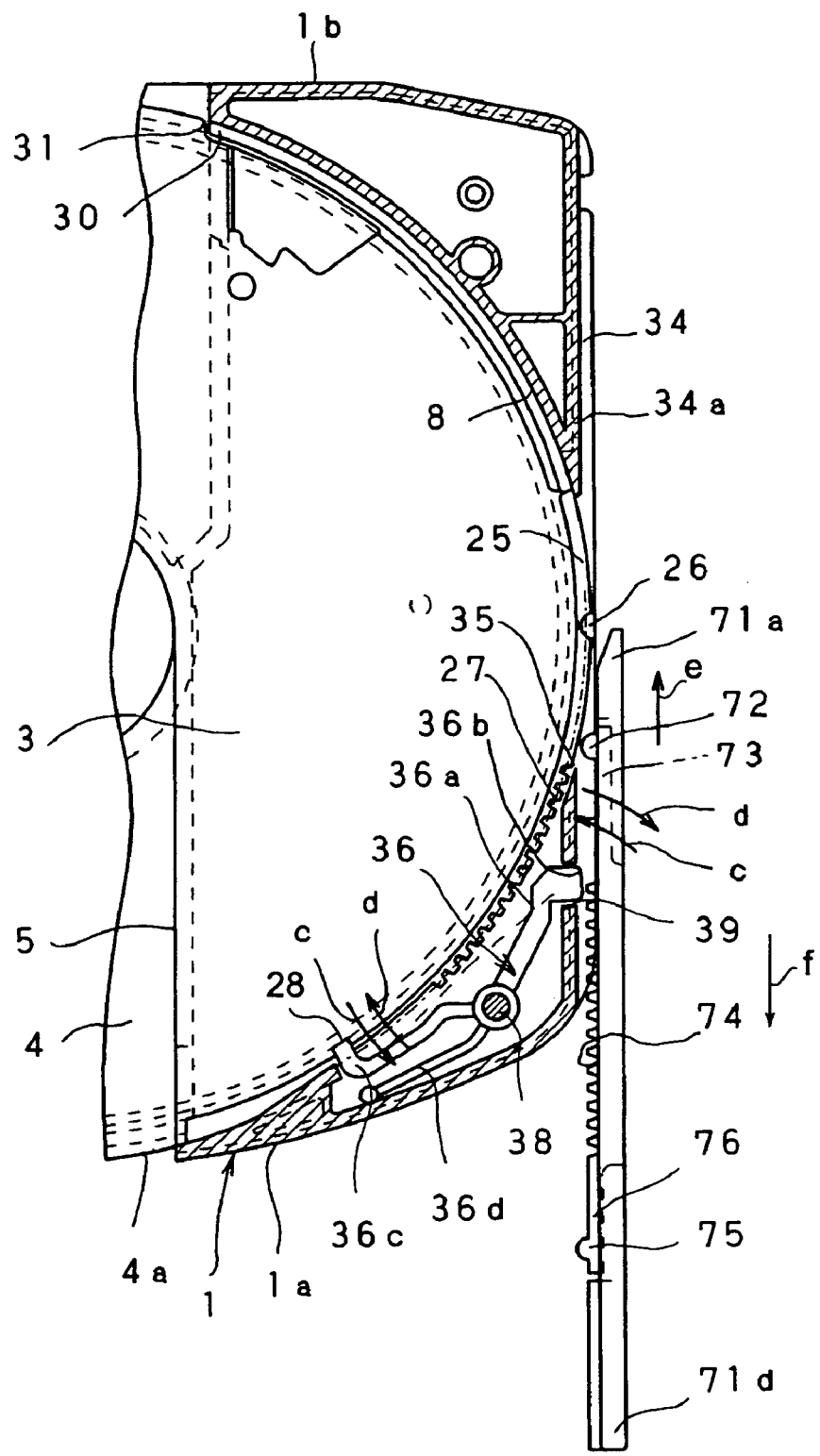
FIG. 3 is a partially cut-away bottom view showing the rotational driving operation of the inner rotor subsequent to the state shown in FIG. 2.

However, as shown in FIG. 3, when the shutter opening and closing start convex portion 72 of the rack member 71 is abutted against the shutter opening and closing start convex portion 25 of the outer periphery of the inner rotor 4 from the arrow e direction, almost simultaneous with this, the top end of the rack portion 74, serving as the locking release portion of the rack member 71, rides on the top end 36b of the locking release arm 36a of the locking member 36, and pushes again this locking release arm 36a in the arrow c direction.

Then, similarly to the above, the locking arm 36c of the locking member 36 pushes against the spring force of the molded spring 36d and is rotationally biased in the arrow c direction, which is a locking release direction, and is thus put into a locking release state and, after that, as long as the inner rotor 4 is rotated just to the shutter opening and closing termination position, the locking member 36 is kept in the locking release state.

Figure 4:
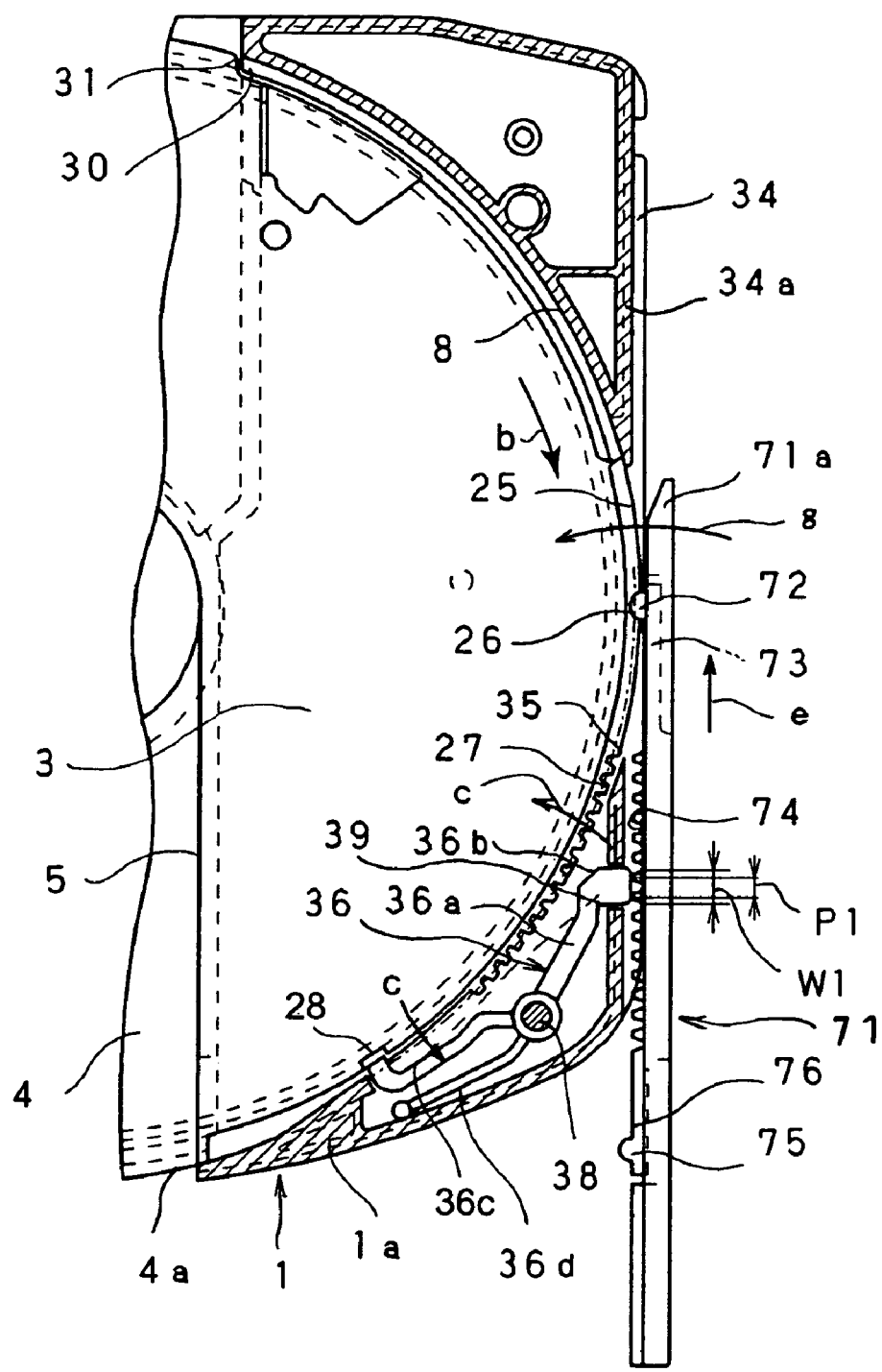
FIG. 4 is a partially cut-away bottom view showing the rotational driving operation of the inner rotor subsequent to the state shown in FIG. 3.

Next, as shown in FIG. 4, when the rack member 71 is continuously slidably driven in the arrow e direction, the shutter opening and closing start convex portion 72 of the top end thereof is engaged with the shutter opening and closing start concave portion 26 of the inner rotor 4 from the arrow g direction due to the spring force of the molded spring 73. The rack member 71 is continuously slidably driven in the arrow e direction, so that the shutter opening and closing start convex portion 72 rotationally drives the shutter opening and closing termination concave portion 28 in the arrow a direction, and the inner rotor 4 begins to be rotationally driven in the arrow a direction from the shutter opening and closing start position.

Figure 5:
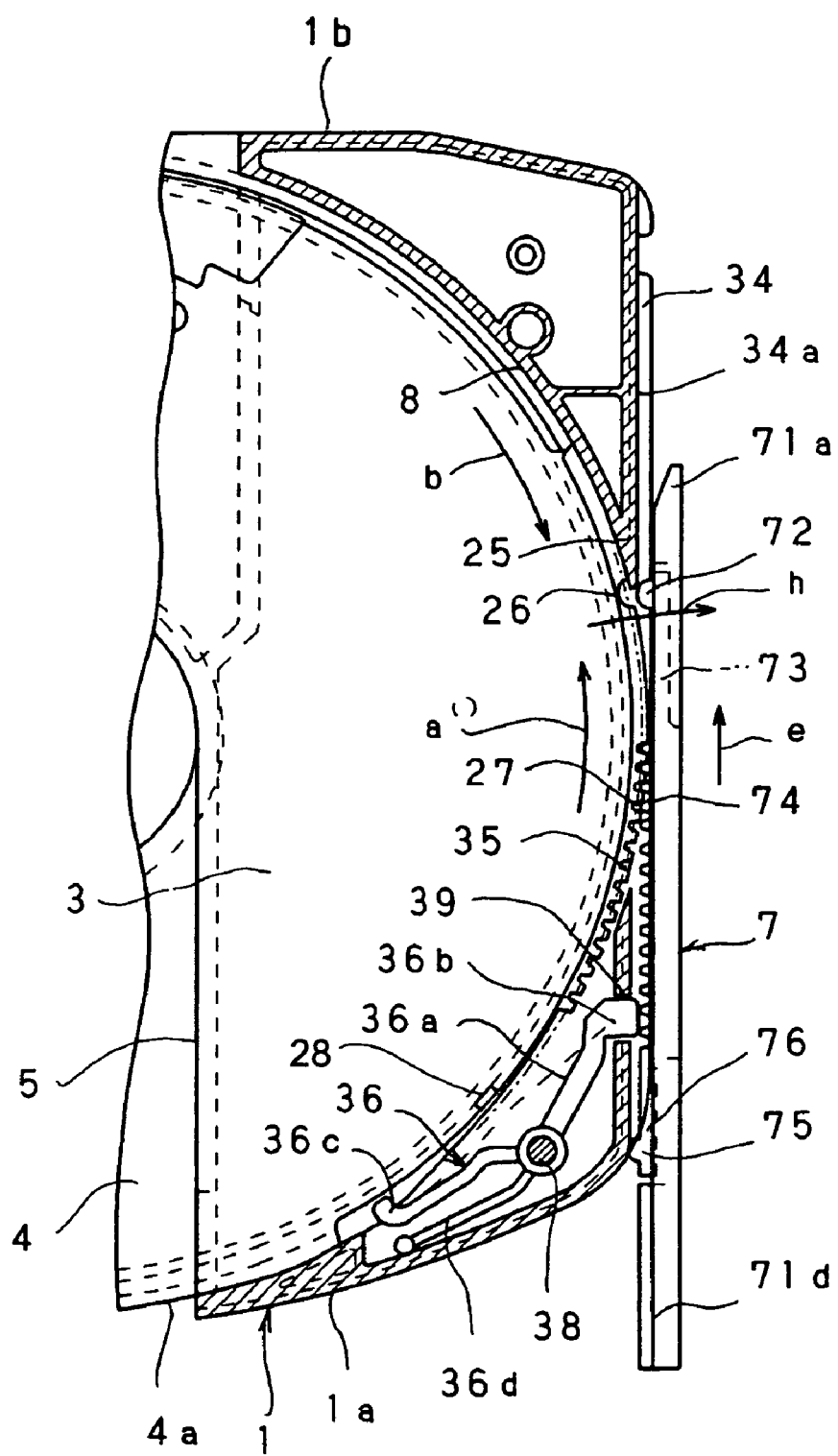
FIG. 5 is a partially cut-away bottom view showing the rotational driving operation of the inner rotor subsequent to the state shown in FIG. 4.
Figure 6:
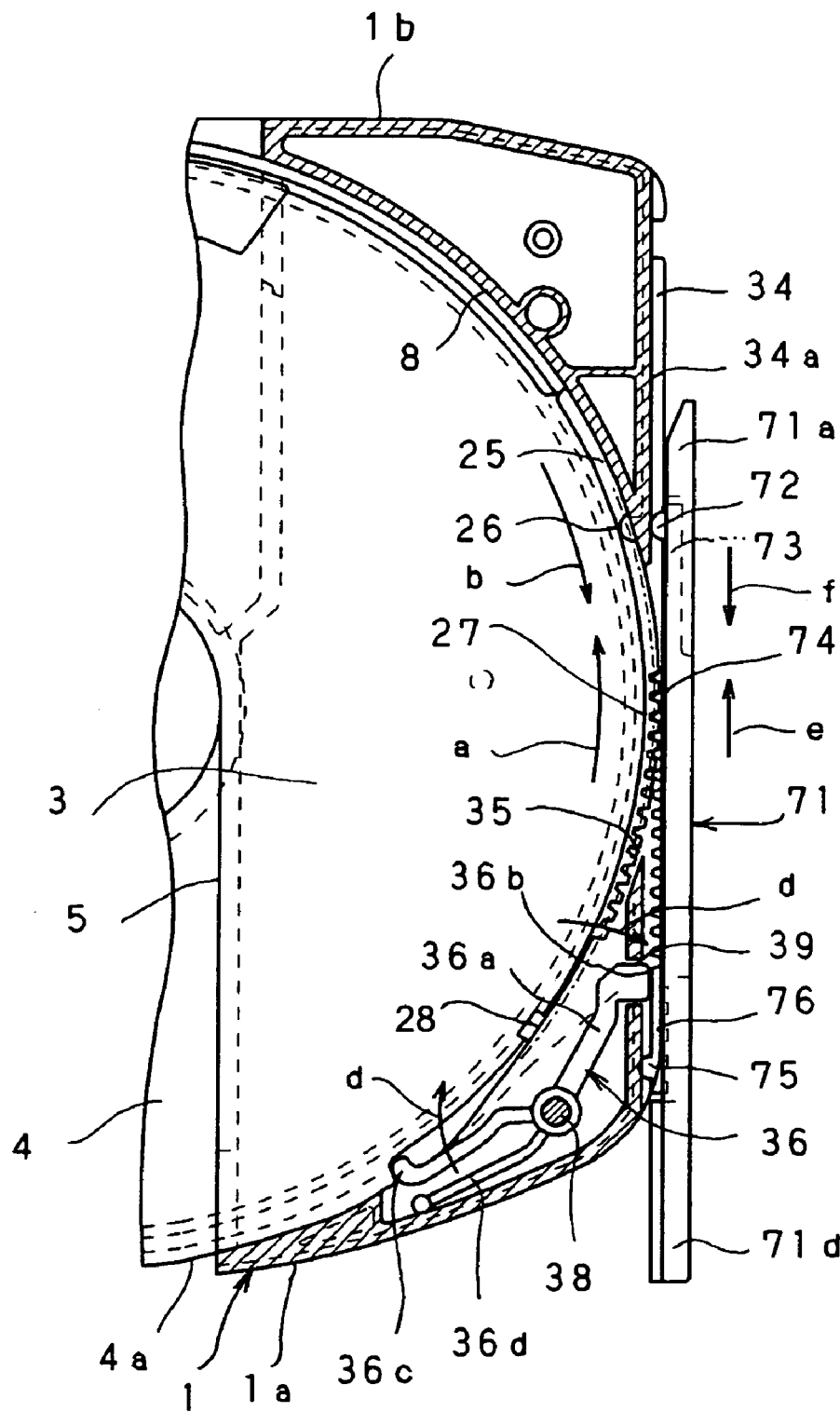
FIG. 6 is a partially cut-away bottom view showing the rotational driving operation of the inner rotor subsequent to the state shown in FIG. 5.

Next, as shown in FIG. 5, when the rack member 71 is continuously slidably driven in the arrow e direction, the rack portion 74 of the rack member 71 is coupled with the partial gear 27 of the outer periphery of the rotor 4 from the arrow e direction and, immediately after this coupling, the shutter opening and closing start convex portion 72 of the rack member 71 is relatively separated from the shutter opening and closing start concave portion 26 of the outer periphery of the inner rotor 4 in the arrow h direction.

After that, as shown in FIGS. 5 to 9, the partial gear 27 of the inner rotor 4 is rotationally driven in a non-stop state by the rack portion 74 of the rack member 71, which is continuously slidably driven in the arrow e direction, so that the inner rotor 4 is strongly rotationally driven in the arrow a direction by opposing a rotational slip friction inside the disc cartridge 1.

Figure 7:
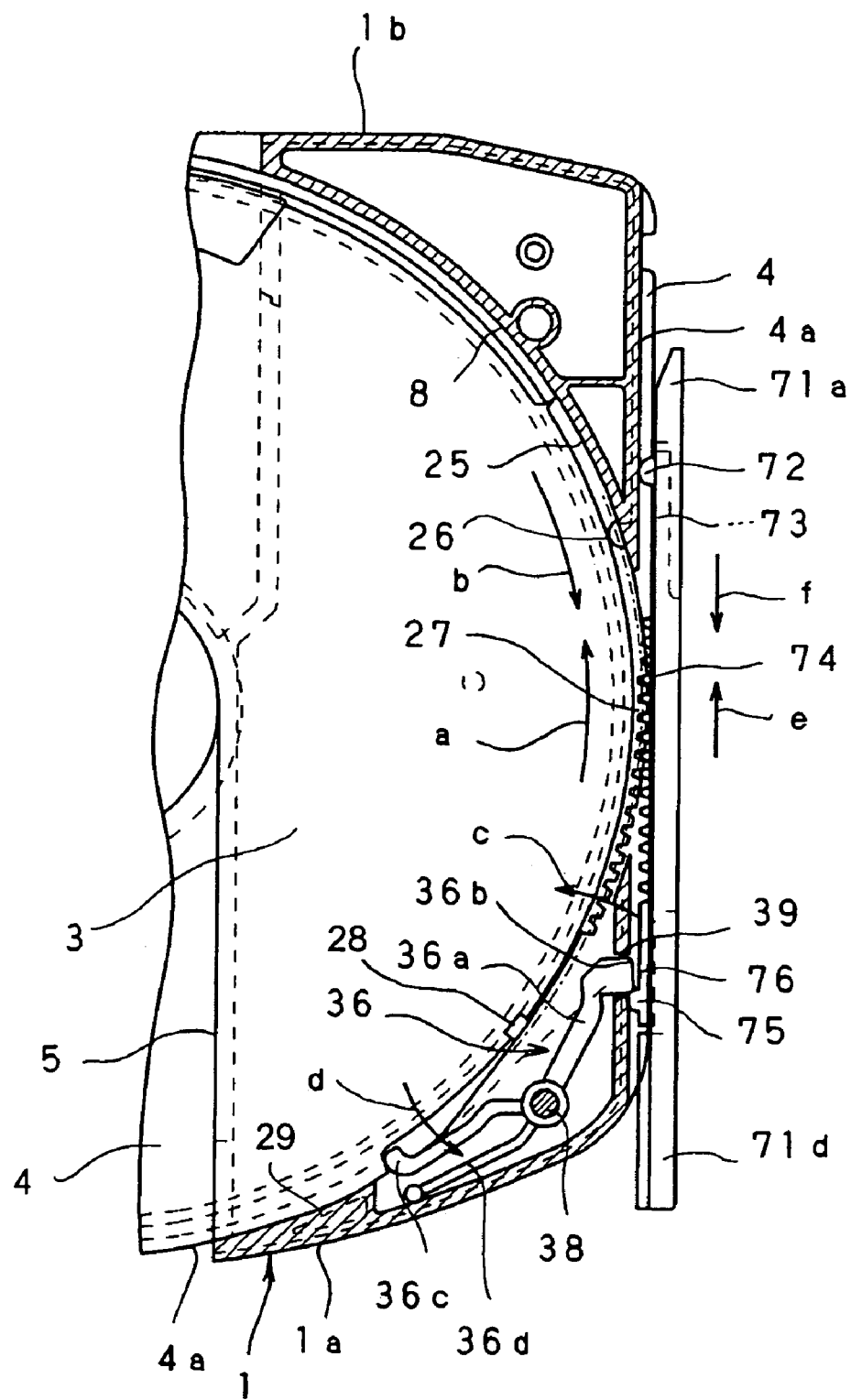
FIG. 7 is a partially cut-away bottom view showing the rotational driving operation of the inner rotor subsequent to the state shown in FIG. 6.
Figure 8:
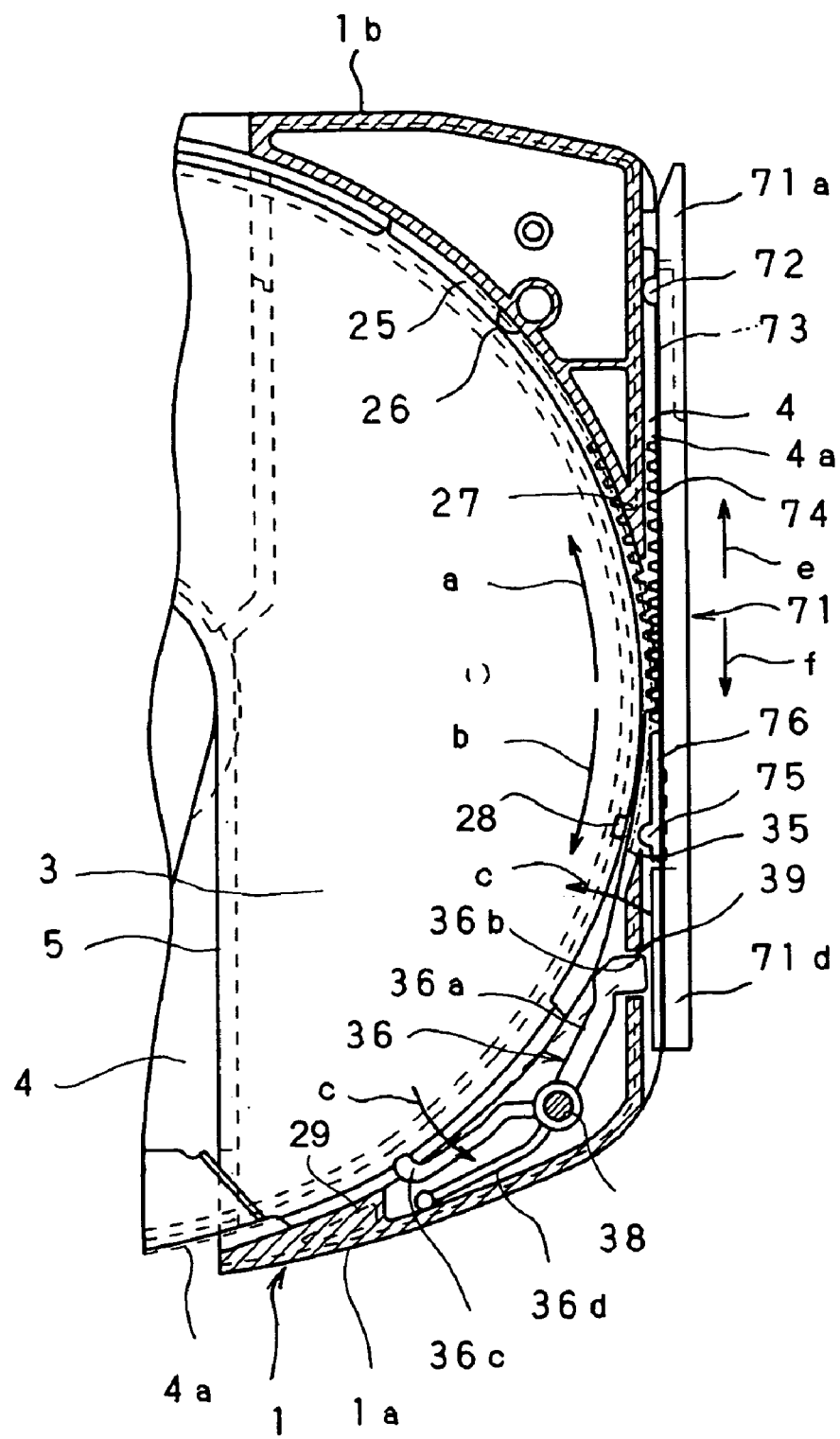
FIG. 8 is a partially cut-away bottom view showing the rotational driving operation of the inner rotor subsequent to the state shown in FIG. 7.

At this time, as shown in FIGS. 7 and 8, midway through the rotation in the arrow a direction of the partial gear 27 of the inner rotor 4 by the rack portion 74 of the rack member 71, the shutter opening and closing termination convex portion 75 of the rack member 71 pushes again the top end 36b of the locking release arm 36a of the locking member 36 in the arrow c direction by opposing the spring force of the molded spring 76 and, therefore, the locking arm 36c rides on a shutter opening and closing termination convex portion 29 integrally formed in a circular-arc shape on the outer periphery of the outer peripheral surface 4a of the inner rotor 4 by opposing the spring force of the molded spring 36d.

Figure 9:
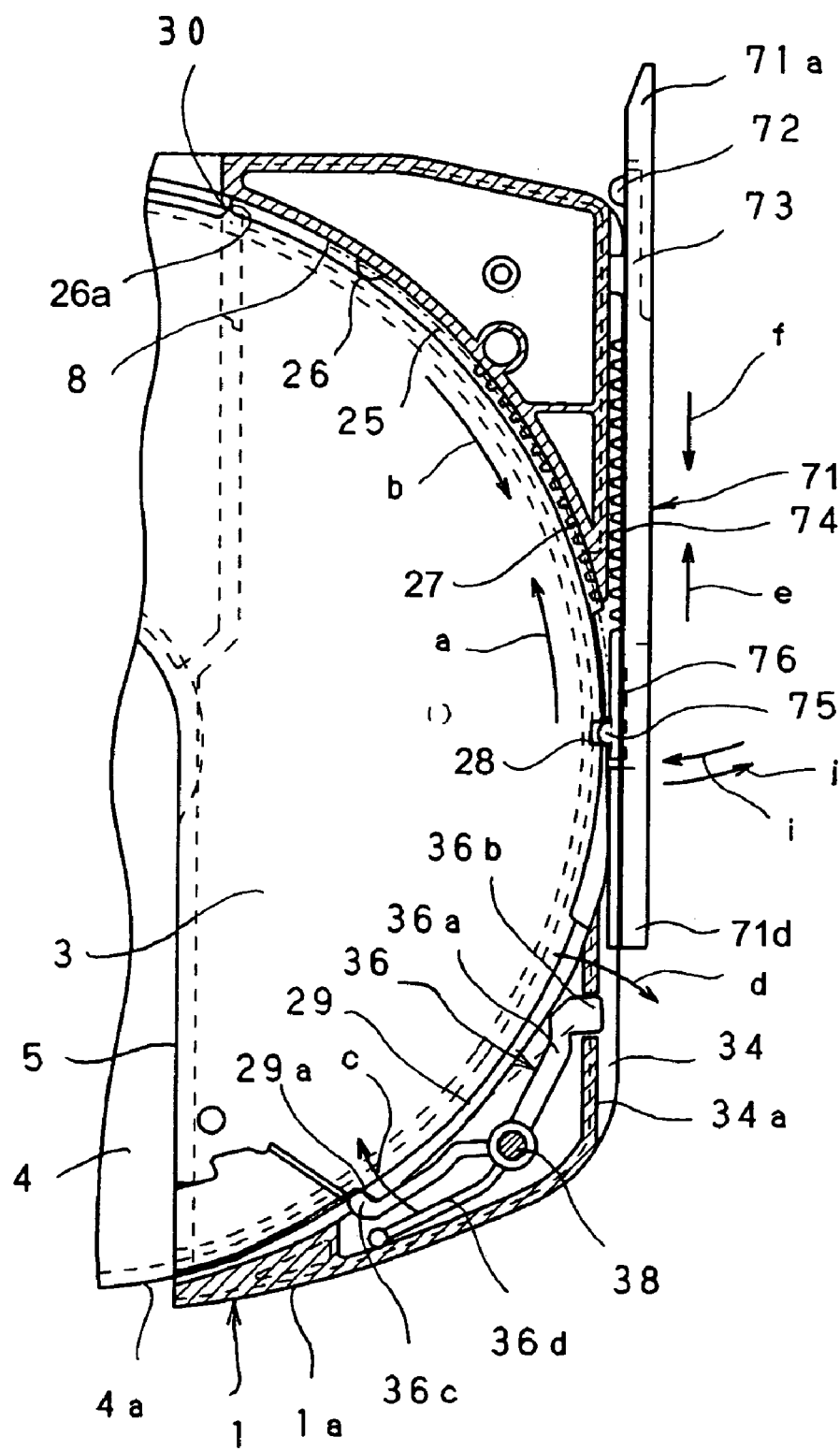
FIG. 9 is a partially cut-away bottom view showing the rotational driving operation of the inner rotor subsequent to the state shown in FIG. 8.
Figure 10:
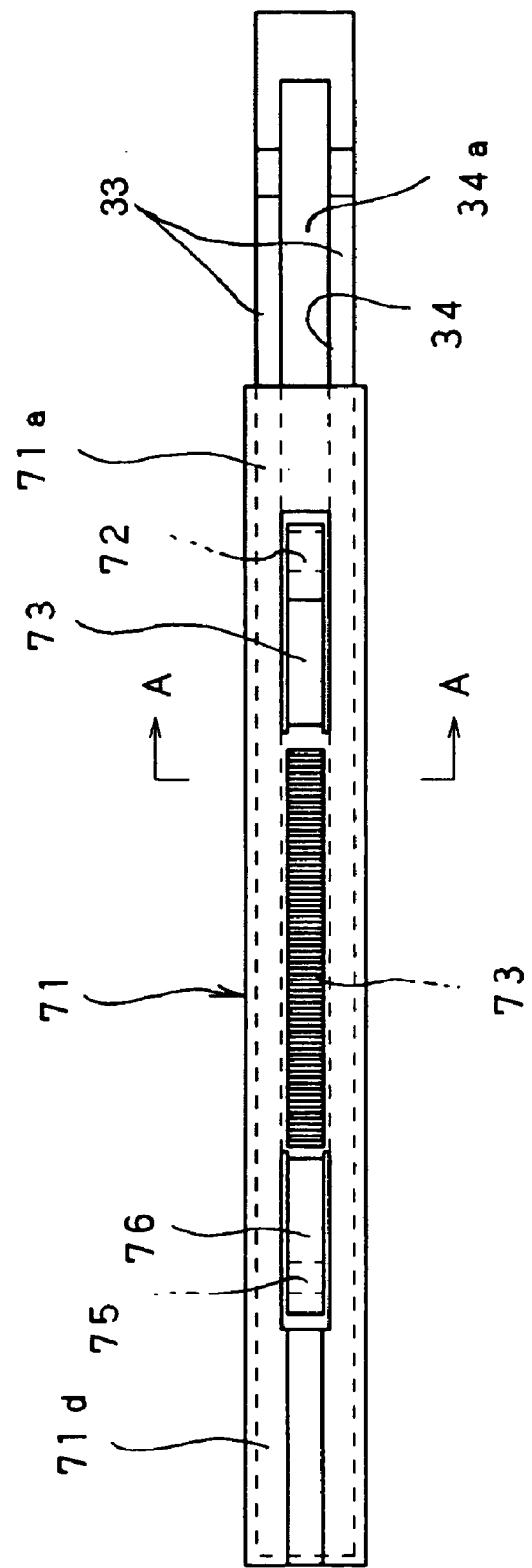
FIG. 10 is a side view of FIG. 6.

FIG. 9 shows the shutter opening and closing termination position of the inner rotor 4 and, immediately before the rack member 71 reaches the position shown in FIG. 9 from the position shown in FIG. 8, the shutter opening and closing termination convex portion 75 of the rack member 71 is engaged with the shutter opening and closing termination concave portion 28 by the molded spring 76 from the arrow i direction due to the spring force of the molded spring 76 and, immediately after that, the rack portion 74 of the rack member 71 is separated from the partial gear 27 of the inner rotor 4.

The rack member 71 is continuously slidably driven in the arrow e direction to a sliding termination position shown in FIG. 9, so that the shutter opening and closing termination convex portion 75 rotationally drives the shutter opening and closing termination concave portion 28 in the arrow a direction, and the inner rotor 4 is rotationally driven in the arrow a direction to the shutter opening and closing termination position shown in FIG. 9. The end surface 26a and the like of the arrow a direction side of the shutter opening and closing start concave portion 26 of the outer periphery of the inner rotor 4 abuts against an inner rotor stopper 30 inside the disc cartridge 1 from the arrow a direction, and thereby the inner rotor 4 is stopped at the shutter opening and closing termination position and, almost simultaneously with that, a locking arm 71c of the rack member 71 falls into an end surface 29a of the arrow b direction side of the shutter opening and closing termination convex portion 29 of the outer periphery of the inner rotor 4 due to the spring force of the molded spring 73, and the inner rotor 4 is locked between the inner rotor stopper 30 and the locking arm 71c at the shutter opening and closing termination position.

At this point of time, as will be described later, the pair of shutters 9 and 10 are completely opened up to the shutter opening and closing termination position, so that the pick-up insertion hole 7 of the disc cartridge 1 is completely opened.

Note that an operation where the inner rotor 4 is rotationally driven from the shutter opening and closing termination position shown in FIG. 9 to the shutter opening and closing start position shown in FIG. 4 by sliding driving in the arrow f direction of the rack member 71 for the disc cartridge 1 and, as will be described later, the pair of shutters 9 and 10 are closed up to the shutter opening and closing start position, is a reverse operation to the above described-operation.

That is, when the rack member 71 is slidably driven in the arrow f direction from the shutter opening and closing termination position shown in FIG. 9, the shutter opening and closing termination concave portion 28 of the rack member 71 is rotationally driven in the arrow b direction. At this time, as shown in FIG. 8, the locking arm 36c of the locking member 36 rides on the shutter opening and closing termination convex portion 29 by opposing the spring force of the molded spring 36d.

As shown in FIGS. 5 to 8, the rack portion 74 of the rack member 71 is coupled with the partial gear 27 of the outer periphery of the inner rotor 4, and the inner rotor 4 is rotationally driven in a non-slip manner in the arrow b direction and, after that, as shown in FIG. 4, the shutter opening and closing start concave portion 26 of the outer periphery of the inner rotor 4 is rotationally driven in the arrow b direction by the shutter opening and closing start convex portion 72 of the rack member 71, and the inner rotor 4 is restored to the shutter opening and closing start position in the arrow b direction. A stopper convex portion 31 and the like integrally formed on the outer periphery of the inner rotor 4 abut against the inner rotor stopper 30 of the disc cartridge 1 from the arrow b direction, and the inner rotor 4 is stopped at the shutter opening and closing start position. Almost simultaneously with that, the locking arm 36c of the locking member 36 is engaged with the shutter opening and closing termination concave portion 28 serving as the lock concave portion of the inner rotor 4, and the inner rotor 4 is again locked at the shutter opening and closing start position.

As shown in FIGS. 1 to 3, the rack member 71 is continuously slidably driven in the arrow f direction, and the shutter opening and closing start convex portion 72 is separated from the shutter opening and closing start concave portion 26 of the outer periphery of the inner rotor 4 by opposing the spring force of the molded spring 73, and the rack member 71 is detached in the arrow f direction from the disc cartridge 1.

(2) Explanation Regarding the Relative Relationship Between the Shutter Opening and Closing Start Concave Portion of the Outer Periphery of the Inner Rotor, the Partial Gear, and the Shutter Opening and Closing Termination Concave Portion, and the Relative Relationship Between the Shutter Opening and Closing Start Convex Portion of a Rack Member, a Rack Portion, and the Shutter Opening and Closing Termination Convex Portion Next, referring to FIGS. 11 to 12, an explanation will be made regarding the relative relationship between the shutter opening and closing start concave portion 26 of the outer periphery of the inner rotor 4, the partial gear 27, and the shutter opening and closing termination concave portion 28, and the relative relationship between the shutter opening and closing start convex portion 72 of the rack member 71, the rack portion 74, and the shutter opening and closing termination convex portion 75, wherein a length L1, on a pitch circle CP, of the partial gear 27 between the shutter opening and closing start concave portion 26 of the outer periphery of the inner rotor 4 and the first tooth 27a in the arrow a direction of the partial gear 27 is matched to a length L2 (L1=L2) between the shutter opening and closing start convex portion 72 of the rack member 71 and the first tooth 74a in the arrow e direction of the rack portion 74 (gear module times integer), and the partial gear 27 and the module and the number of teeth of the rack portion 74 are matched, and a length L3 on the pitch circle PC of the partial gear 27 between the last tooth 27b in the arrow a direction of the partial gear 27 of the outer periphery of the inner rotor 4 and the shutter opening and closing termination concave portion 28 is matched to a length L4 (L3=L4) between the last tooth 74b in the arrow e direction of the rack portion 74 of the rack member 71 and the shutter opening and closing termination convex portion 75.

As described above, this structure accurately, reliably and smoothly performs the basic operation for rotationally driving the inner rotor 4 in the arrow a direction from the shutter opening and closing start position shown in FIG. 4 to the shutter opening and closing termination position shown in FIG. 9, while engaging and coupling the shutter opening and closing start convex portion 72 of the rack member 71, the rack portion 74, and the shutter opening and closing termination convex portion 75, in this order, with the shutter opening and closing start concave portion 26 of the outer periphery of the inner rotor 4, the partial gear 27, and the shutter opening and closing termination concave portion 28 by slidably driving the rack member 71 in the arrow e direction; and the basic operation for rotationally driving the inner rotor 4 in the arrow b direction, while engaging and coupling the shutter opening and closing termination convex portion 75 of the rack member 71, the rack portion 74, and the shutter opening and closing start convex portion 72, in this order, with the shutter opening and closing termination concave portion 28 of the outer periphery of the inner rotor 4, the partial gear 27, and the shutter opening and closing start concave portion 26 by slidably driving the rack member 71 in the arrow f direction.

Hence, in any type of insertion system (slot in tray system and the like) of the disc cartridge 1 for the disc drive unit 61 to be described later, the shutter opening and closing operation by rotationally driving the inner rotor 4 can always be performed reliably and smoothly.

Note that the circular arc-shaped shutter opening and closing start convex portion 25 is disposed between the shutter opening and closing start concave portion 26 of the outer periphery of the inner rotor 4 and the first tooth 27a of the partial gear 27, and no partial gear 27 exists in this space. Therefore, when the rack member 71 is slidably driven in the directions indicated by arrows e and f and the shutter opening and closing start convex portion 72 is slid between the shutter opening and closing start concave portion 26 and the first tooth 27a of the partial gear 27, the shutter opening and closing start convex portion 72 can smoothly ride on and off the shutter opening and closing start convex portion 25, and the shutter opening and closing start convex portion 25 slides on the partial gear 27, so that no rattling sounds are generated at all.

As disclosed in FIG. 4 and the like, a width W1 of the top end 36b of the rack longitudinal direction, which is a contact surface for the rack portion 74 of the locking release arm 36a of the locking member 36, is set sufficiently larger than a pitch P1 of the rack portion 74 and, therefore, even when the edge of the rack portion 74 slides on the top end 36b in the directions indicated by arrows e and f, while pushing the top end 36b of the locking release arm 36a in the arrow c direction by pushing against the molded spring 36d, no rattling sounds are generated, and the rack portion 74 can smoothly slide in the directions indicated by arrows e and f, while reliably pushing the locking release arm 36a in the arrow c direction.

Further, at this time, as shown in FIGS. 11 and 12, the top shapes of the shutter opening and closing start convex portion 72 and the shutter opening and closing termination convex portion 75 of the rack member 71 are formed in an R-shape and, therefore, as described above, the load can be reduced when these shutter opening and closing start convex portion 72 and shutter opening and closing termination convex portion 75 are engaged with or separated from the shutter opening and closing start concave portion 26 and the shutter opening and closing termination concave portion 28.

Hence, advantages can be achieved in that not only can the opening and closing drive of the shutters 9 and 10 be smoothly operated at a low torque by rotationally driving the inner rotor 4 with the rack member 71 in the directions indicated by arrows a and b, but also mutual friction and damage between these shutter opening and closing start convex portion 72 and shutter opening and closing termination convex portion 75, or between the shutter opening and closing start concave portion 26 and shutter opening and closing termination concave portion 28, can be avoided as much as possible.

(3) Explanation Regarding a Rack Member Reference Surface Defined by the Side Surface of the Disc Cartridge Next, referring to FIGS. 13 to 16, an explanation will be made regarding a reference surface 33 defined at the one side surface of the disc cartridge 1. As will be described later, upper and lower shells 2 and 3 of the disc cartridge 1 are formed of molded members made of synthetic resin or the like, and the concave groove 34 is formed at one side surface 1c which is formed horizontally along the center portion in the vertical thickness direction, the one side surface 1c being the reference surface 33 accurately measured at both the upper and lower sides of the concave groove 34.

Figure 14A:
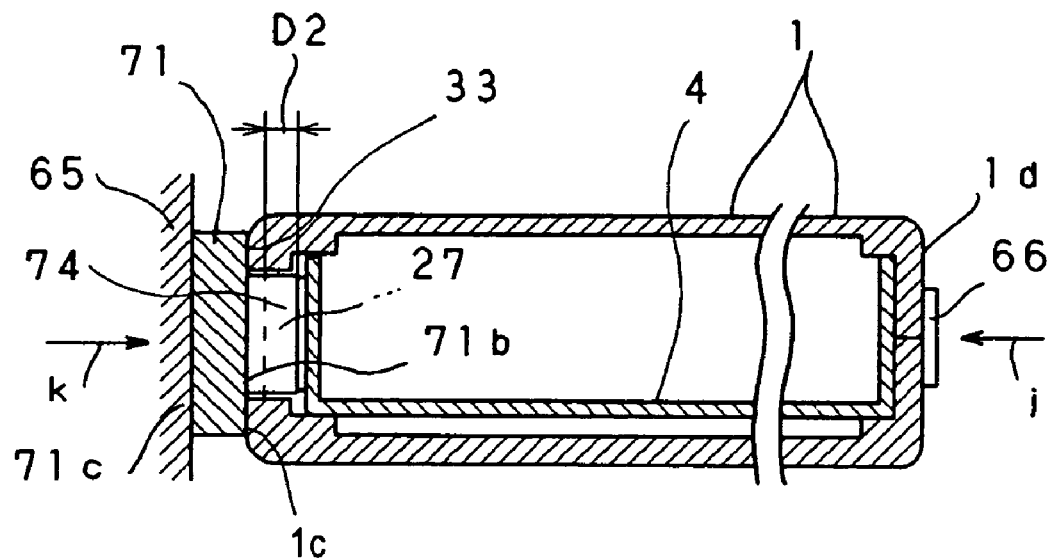
FIGS. 14A to 14B are partially cut-away sectional views along line A—A of FIG. 10.
Figure 15:
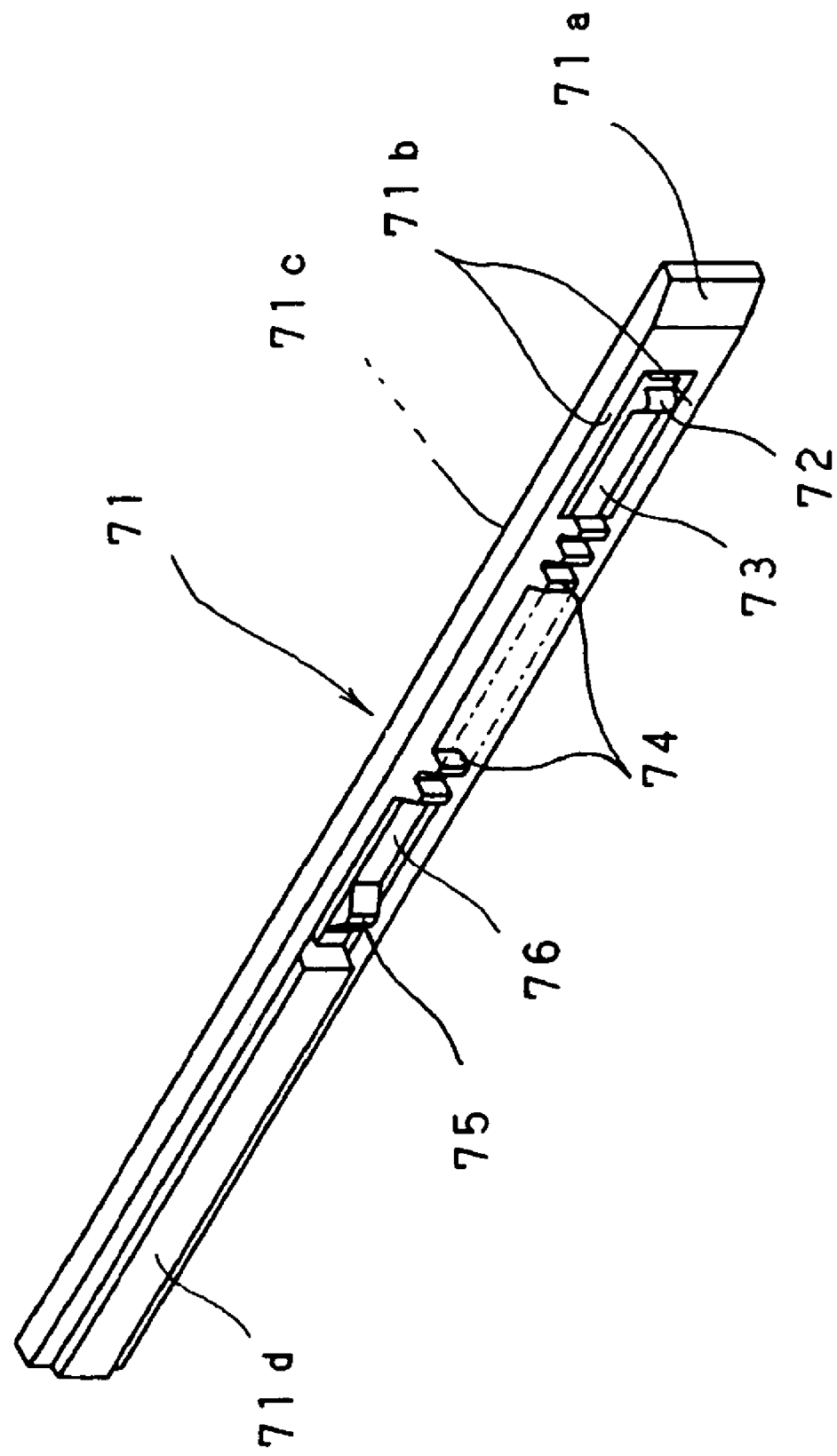
FIG. 15 is a perspective view of the rack member.
Figure 16:
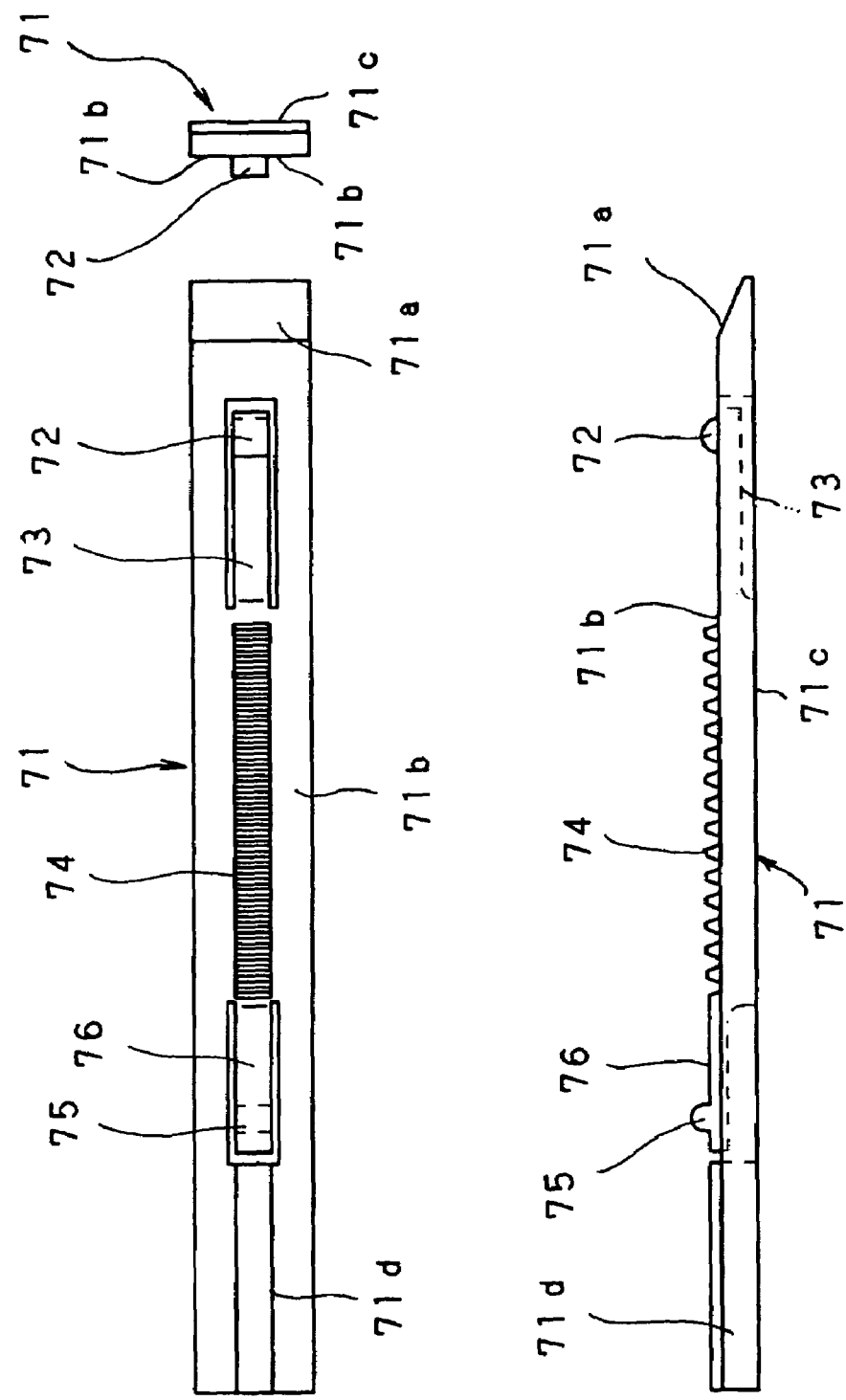
FIG. 16 is a view showing a side surface, a lower surface, and an upper surface of the rack member.

On the other hand, according to one example of the rack member 71 shown in FIGS. 14A, 15, 16, the rack member 71 is formed almost in a strip-shape, and the shutter opening and closing start convex portion 72, the molded spring 73, the rack portion 74, the shutter opening and closing termination convex portion 75, and the molded spring 76 are integrally formed in a row (horizontally) along the center portion in the width direction (upper and lower directions) in one side surface 71b of the rack member 71.

Hence, as described in FIGS. 2 to 9, the rack member 71 is relatively slidably driven in the directions indicated by arrows e and f along the one side surface 1c of the disc cartridge 1, and the shutter opening and closing start convex portion 72 of the rack member 71, the rack portion 74, and the shutter opening and closing termination convex portion 75 are moved in the directions indicated by arrows e and f along the inside of the concave groove 34 of the disc cartridge 1. In addition, when the inner rotor 4 is rotationally driven in the directions indicated by arrows a and b while these shutter opening and closing start convex portion 72, rack portion 74, and shutter opening and closing termination convex portion 75 are engaged and coupled, in this order, with the shutter opening and closing start concave portion 26 of the outer periphery of the inner rotor 4, the partial gear 27, and the shutter opening and closing termination convex portion 28, both the upper and lower surfaces of one side surface 71b of the rack member 71 are accurately guided by the reference surface 33 of both the upper and lower sides of the concave groove 34 of the disc cartridge 1.

Figure 13:
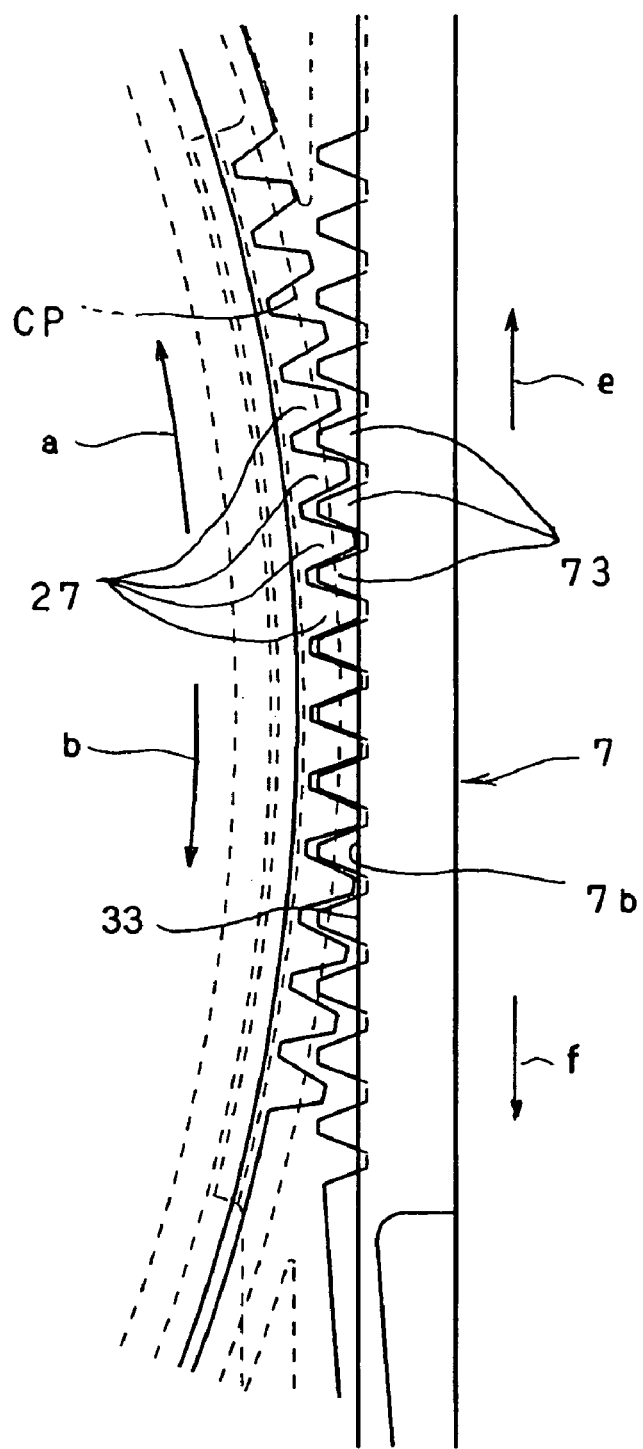
FIG. 13 is an enlarged bottom view showing a coupling portion between the partial gear of the inner rotor and the rack portion of the rack member.

In this way, as shown in FIGS. 13 and 14A, each engaging (coupling) depth D2 for the shutter opening and closing start convex portion 72 of the rack member 71, the rack portion 74, the shutter opening and closing start concave portion 26 of the shutter opening and closing termination convex portion 75, the partial gear 27, and the shutter opening and closing termination concave portion 28 can be always accurately controlled to a design value.

Hence, even if there are some slight variations in the parts dimensions, as described above, by the sliding movement in the directions indicated by arrows e and f of the rack member 71, the inner rotor 4 can be accurately and reliably rotationally driven in a non-slip manner in the directions indicated by arrows a and b, so that the opening and closing driving of the shutters 9 and 10 can always be performed reliably and, therefore, irrespective of the insertion system (slot in tray system) of the disc cartridge 1 for the disc drive unit 61 to be described later, the opening and closing operation of the shutters 9 and 10 can be performed reliably.

Referring now to FIG. 14A, the other side surface (surface in an opposite side to the disc cartridge 1 side) 71c of the rack member 71 is stopped by a sliding reference portion 65 formed by a cartridge holder 64 and the like to be described later, the other side surface 1d of the disc cartridge 1 is pressed from a direction indicated by an arrow j by a side pressure spring 66, such as a coil spring or the like and, by that reaction force, the one side surface 71b of the rack member 71 is elastically pressed against the reference surface 33 of the disc cartridge 1 from the arrow k direction.

When constituted in such a way, the variation of the engaging (coupling) depth D2 due to the variation of parts dimensions can be more reliably prevented and a high reliability can be secured.

Figure 14B:
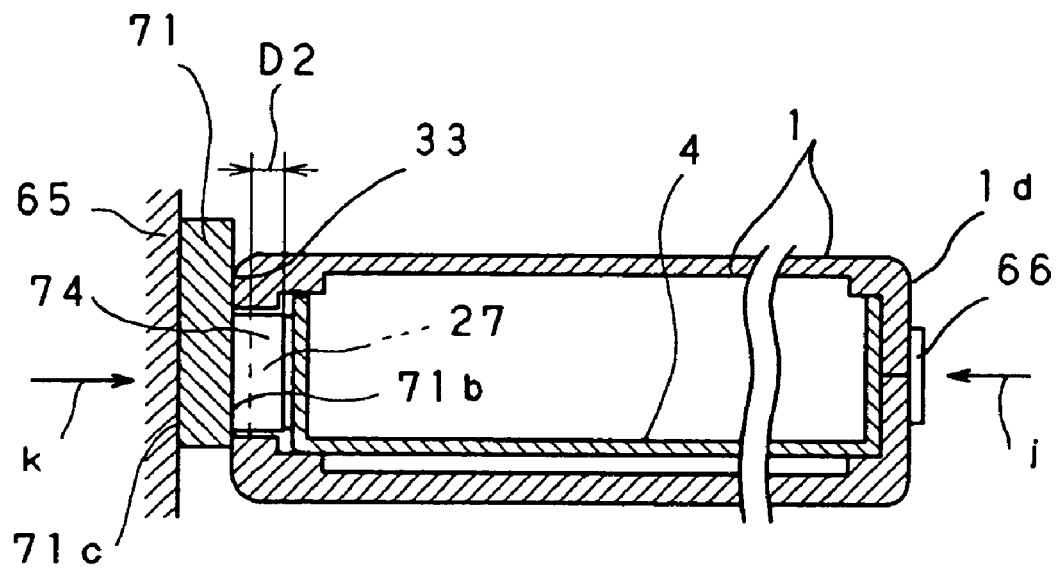

Note that, at this time, the same effect can be obtained even when the layout of the sliding reference portion 65 and the side pressure spring 66 shown in FIGS. 14A and 14B are reversed from the left to the right.

Further, referring to FIG. 14B, the shutter opening and closing start convex portion 72 of the rack member 71, the molded spring 73, the rack portion 74, the shutter opening and closing termination convex portion 75, and the molded spring 76 are provided by being biased above or below (upper and lower directions) in the width direction of the rack member 71, and the one side surface 71b of the rack member 71 is guided by one reference surface 33 only from among the reference surfaces 33 of both the upper and lower sides of the concave groove 34 of the disc cartridge 1. In this case also, the same effect can be obtained.

(4) Explanation Regarding the Rack Member

Next, referring to FIGS. 17 to 20, an explanation will be made regarding a support mechanism of the shutter opening and closing start convex portion 72 and the shutter opening and closing termination convex portion 75 of the rack member. First, FIGS. 17, 18 and 19 show the integral formation of the shutter opening and closing start convex portion 72, the molded spring 73, the shutter opening and closing termination convex portion 75, and the molded spring 76 when the rack portion 74 is formed on the rack member 71 by a molded member formed of synthetic resin or the like.

Figure 17:
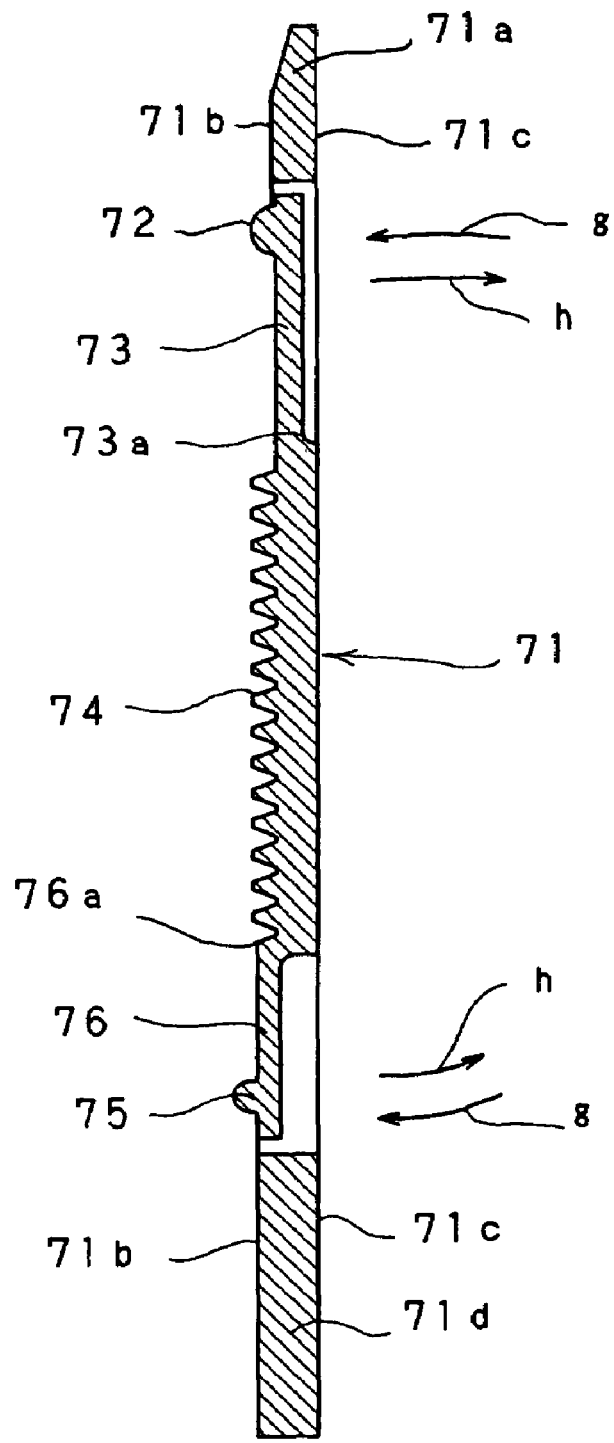
FIG. 17 is a sectional bottom view of the basic shape of the rack member.

FIG. 17 reverses back-to-front the molded springs 73 and 76, which cantilever-support the shutter opening and closing start convex portion 72 and the shutter opening and closing termination convex portion 75 with the top ends thereof, for the longitudinal direction (arrows e, f directions) of the rack member 71, and places connection points 73a and 76a for the rack member 71 of these molded springs 73 and 76 at the inside positions at the both ends 71a and 71d of the rack member 71.

Figure 18:
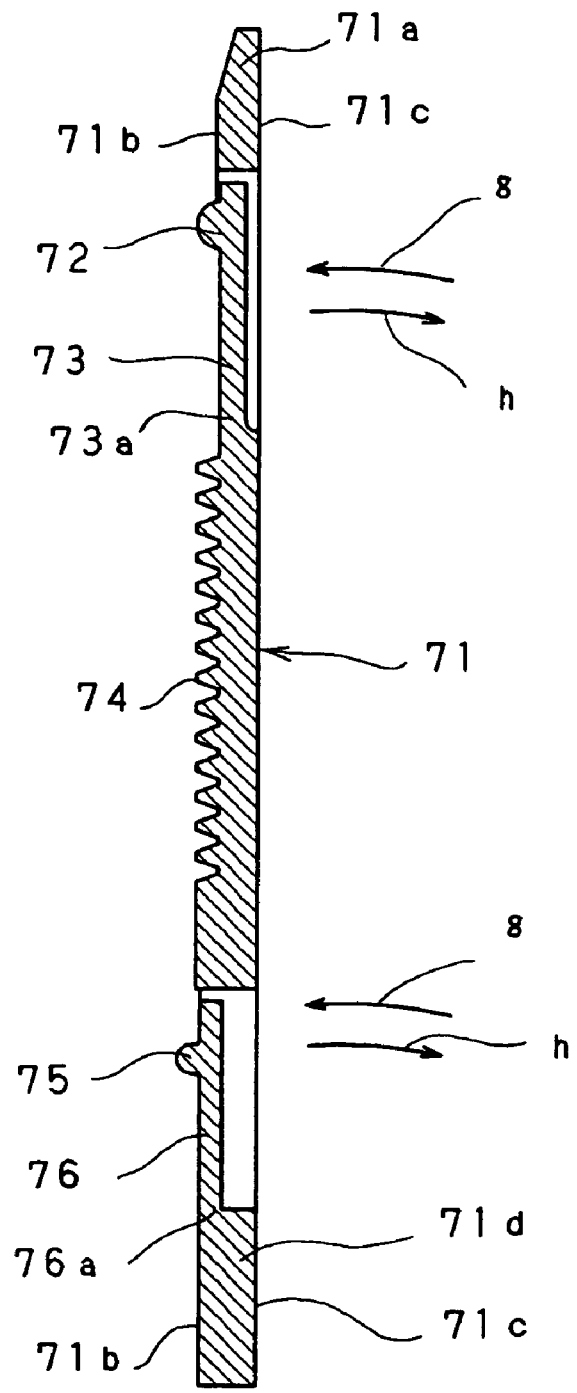
FIG. 18 is a sectional bottom view of a first modified example of the rack member.

Further, referring to FIG. 18, the molded springs 73 and 76 are turned in the same direction, which cantilever-support the shutter opening and closing start convex portion 72 and the shutter opening and closing termination convex portion 75 with the top ends thereof, and the connection points 73a and 76a for the rack member 71 of these molded springs 73 and 76 are arranged in the same direction.

Figure 19:
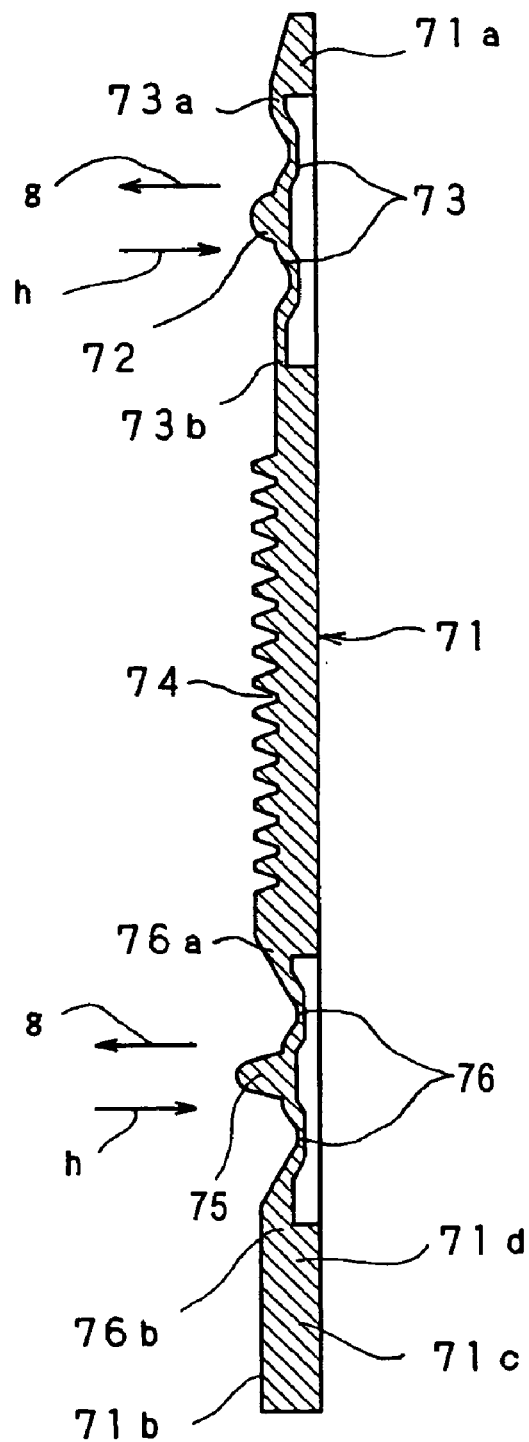
FIG. 19 is a sectional bottom view of a second modified example of the rack member.

Further, referring to FIG. 19, both ends in the directions indicated by arrows e and f of the molded springs 73 and 76, which support the shutter opening and closing start convex portion 72 and the shutter opening and closing termination convex portion 75 at the centers thereof, are formed with the connection points 73a and 73b and 76a and 76b for the rack member 71.

When constituted as described above, the shutter opening and closing start convex portion 72 and the shutter opening and closing termination convex portion 75 can be movably supported by molded springs 73 and 76 each in the directions indicated by arrow g and h, which are coupling and separating directions of the shutter opening and closing start concave portion 26 and the shutter opening and closing termination concave portion 28 of the outer periphery of the above-described inner rotor 4, and a basic operation for always strongly and reliably engaging these shutter opening and closing start convex portion 72 and shutter opening and closing termination convex portion 75 with the shutter opening and closing start concave portion 26 and the shutter opening and closing termination concave portion 28, respectively, due to the spring force of the molded springs 73 and 76 from the directions indicated by arrows g and i can be reliably performed. Further, a basic operation for separating these shutter opening and closing start convex portion 72 and shutter opening and closing termination convex portion 75 from the shutter opening and closing start concave portion 26 and the shutter opening and closing termination concave portion 28 in the directions indicated by arrows h and j by opposing the force of the molded springs 73 and 76 can be smoothly performed.

According to a molded integral construction shown in FIGS. 17 to 19, a step of assembling the shutter opening and closing start convex portion 72 and the shutter opening and closing termination convex portion 75 on the rack member 71 by a separate process can be omitted and, therefore, the molded integral construction is also advantageous in terms of cost.

Figure 20:
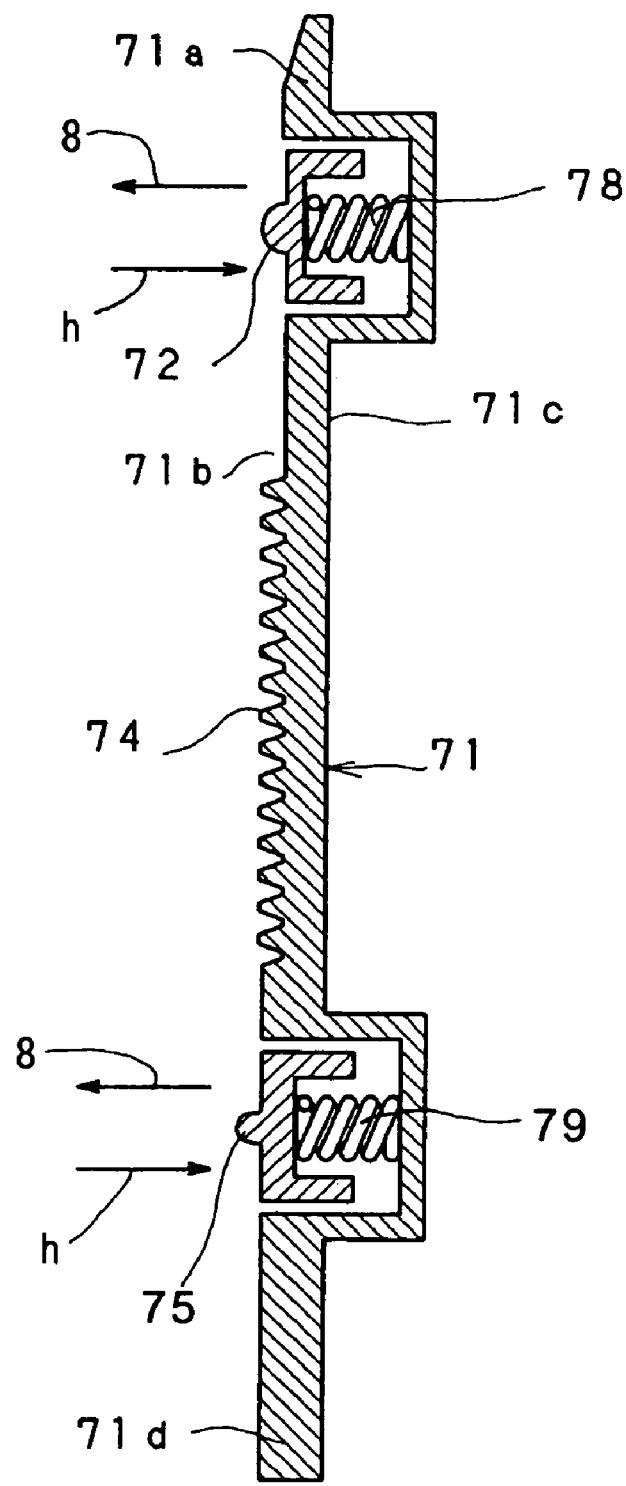
FIG. 20 is a sectional bottom view of a third modified example of the rack member.
Figure 21:
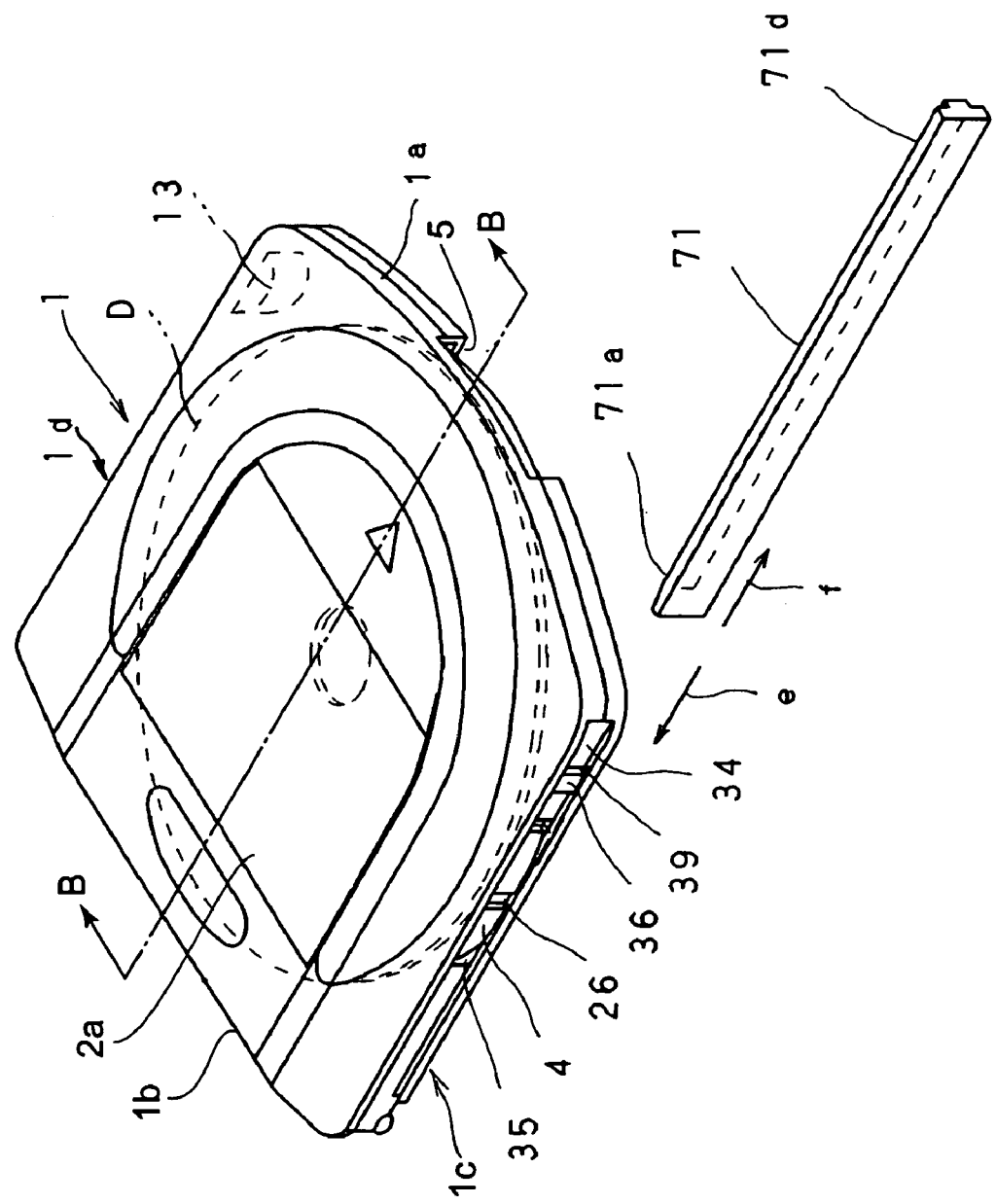
FIG. 21 is a perspective view of the disc cartridge and the rack member.

Next, FIG. 20 shows the movable support in the directions indicated by arrows g and h of the shutter opening and closing start convex portion 72 and the shutter opening and closing termination convex portion 75 through spring members 78 and 79 such as a coil, a spring plate, a spring and the like. In this case also, a basic operation for engaging or separating the shutter opening and closing start convex portion 72 and the shutter opening and closing termination convex portion 75 with or from the shutter opening and closing start concave portion 26 and the shutter opening and closing termination concave portion 28 in the directions indicated by arrows g and h can be reliably and smoothly performed.

(5) Explanation Regarding the Disc Cartridge Using the Inner Rotor

Next, referring to FIGS. 21 to 24, an explanation will be made regarding the disc cartridge 1 using the inner rotor 4. First, as shown in FIGS. 21 to 24, the upper and lower shells 2 and 3 of the disc cartridge 1, the inner rotor 4, the pair of shutters 9 and 10 and the like are formed of molded members made of synthetic resin or the like. The front surface 1a of the disc cartridge 1 formed in a flat and almost square shape by coupling almost symmetrically shaped upper and lower shells 2 and 3 from above and below is curved in a gentle circular arc shape. A symmetrical tapered portion is formed in a straight line at both the left and right ends of the rear surface 1b, and both the left and right side surfaces 1c and 1d are formed in parallel. The above-described concave groove 34 is formed horizontally along the center portion in the thickness direction of the one side surface 1c and, as described above, the bottom 34a of the concave groove 34 is provided with the window hole 35 and the hole 39. Opposite from substantially the center portion of the lower shell 3 to the center portion of the front surface 1a, a pick-up insertion slot 5 having a long hole shape is formed.

The inner rotor 4 is formed in a circular dish shape, and a circular outer peripheral wall 4c is integrally formed on the outer periphery of the bottom 4b. Opposite from the center portion of the bottom 4b to the outer periphery, an opening portion 4d having the same shape as the pick-up insertion slot 5 of the lower shell 3 is formed. This inner rotor 4 is horizontally assembled inside a circular rotor housing portion 8 formed between the upper and lower shells 2 and 3 so as to be rotatably attached. On the bottom 4b of the inner rotor 4, the disc D, such as a DVR or the like, which is a disc-shaped medium, is horizontally and rotatably housed in a state allowing it to make a certain quantity of vertical motion.

An almost disc-shaped disc damper 11 formed by a magnetic member is attached to a center portion of the under surface of the upper shell 2 by a damper support ring 12, which is fixed to the under surface of the upper shell 2 by welding or the like. This disc damper 11 is rotatable with respect to the upper shell 2 and, at the same time, is supported in the vertical direction so as to be liftable within a certain range. An almost U-shaped swollen portion 2a is formed at a center portion of the upper surface of the upper shell 2. Note that a semicircle-shaped concave locking portion 13 is formed at a position at the other side surface 1d of the disc cartridge 1 and close to the front side 1a.

A pair of thin plate-shaped shutters 9 and 10 formed in an almost semicircular shape are housed almost at the same height inside a shutter housing space 7, which is a space horizontally formed between the bottom 4b of the inner rotor 4 and the lower shell 3.

A shutter opening and closing mechanism 16, which performs opening and closing driving of the pair of shutters 9 and 10 by rotation of the inner rotor 4 are installed in a space between the bottom 4b of the inner rotor 4 and the lower shell 3. This shutter opening and closing mechanism 16 is integrally formed at a position 180° opposite to the under surface of the bottom 4b of the inner rotor 4, and rotatably supports the end portions of mutually opposing sides of the pair of shutters 9 and 10, and is constituted by a so-called cam mechanism, which is constituted by a pair of rotational support points 17 and 18, which mutually rotate integrally with inner rotor 4, a pair of almost parallel cam grooves 19 and 20 formed at the end portions of mutually opposing sides of a pair of shutters 9 and 10, and a pair of cam pins 21 and 22 which are fixed pins integrally formed at 180° opposed positions on the bottom 4b of the lower shell 3.

(6) Explanation Regarding Shutter Opening and Closing Mechanism, which is Opened and Closed by Rotation of the Inner Rotor Next, referring to FIGS. 25 to 32, an explanation will be made regarding the shutter opening and closing mechanism 16, which is opened and closed by rotation of the inner rotor 4. When this shutter opening and closing mechanism 16, as shown in FIGS. 22, 26 and 28, is in a state where the inner rotor 4 is rotationally restored, in the arrow b direction, to the above-described shutter opening and closing start position (=shutter closed position), the pair of shutters 9 and 10 are rotated in the arrow m direction around a pair of rotational support point pins 17 and 18, and approach each other at the shutter blocking position which obliquely crosses the vicinity of the center of the pick-up insertion slot 5, and lie one-upon-another at overlapping slopes 9a and 10a symmetrically formed above and below, in a Z shape, along the end edges of the pair of these shutters 9 and 10, thereby blocking an opening at the center overlapping portion between the pick-up insertion slot 5 of the lower shell 3 and the opening portion 4d of the inner rotor 4.

That is, in this shutter blocking state, the entire area of the pick-up insertion slot 5 of the lower shell 3 is completely blocked by the bottom 4b of the inner rotor 4 and the pair of shutters 9 and 10.

Figure 27:
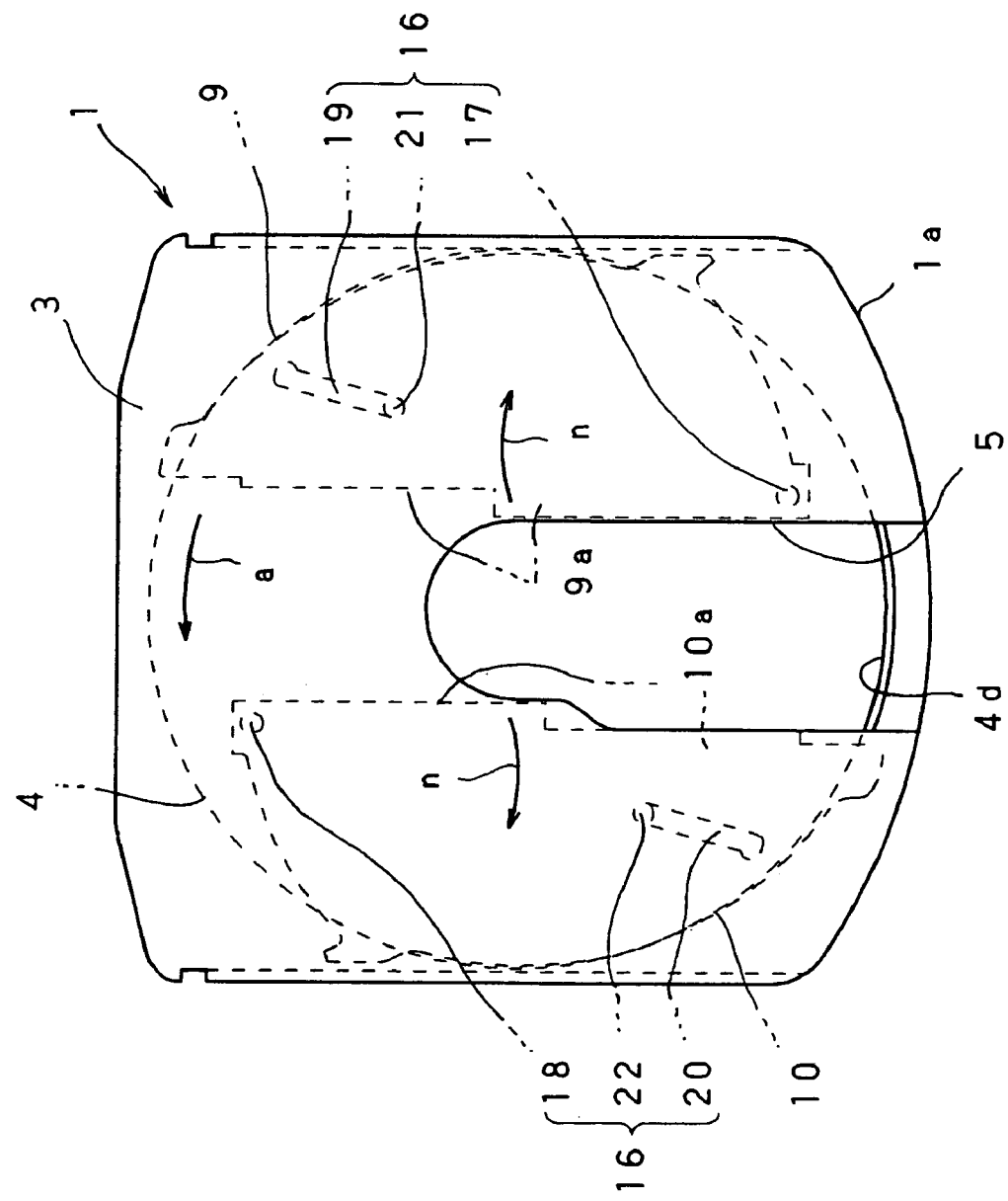
FIG. 27 is a bottom view showing an open shutter state of the pick-up insertion slot of the disc cartridge.
Figure 28:
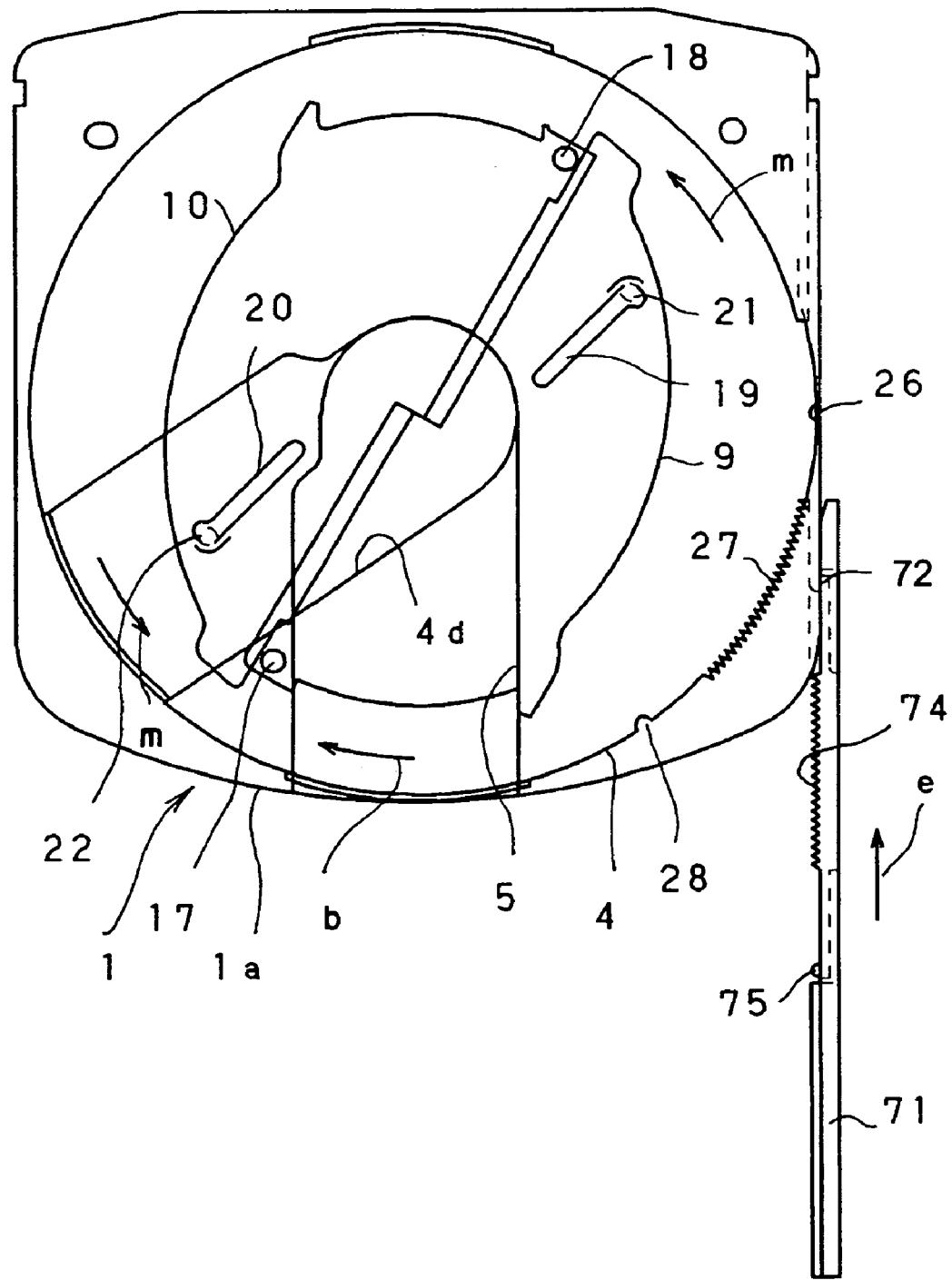
FIG. 28 is a see-through bottom view, showing the closed state of the shutter, which open-close drives the shutter by rotational driving of the inner rotor by the rack member.
Figure 29:
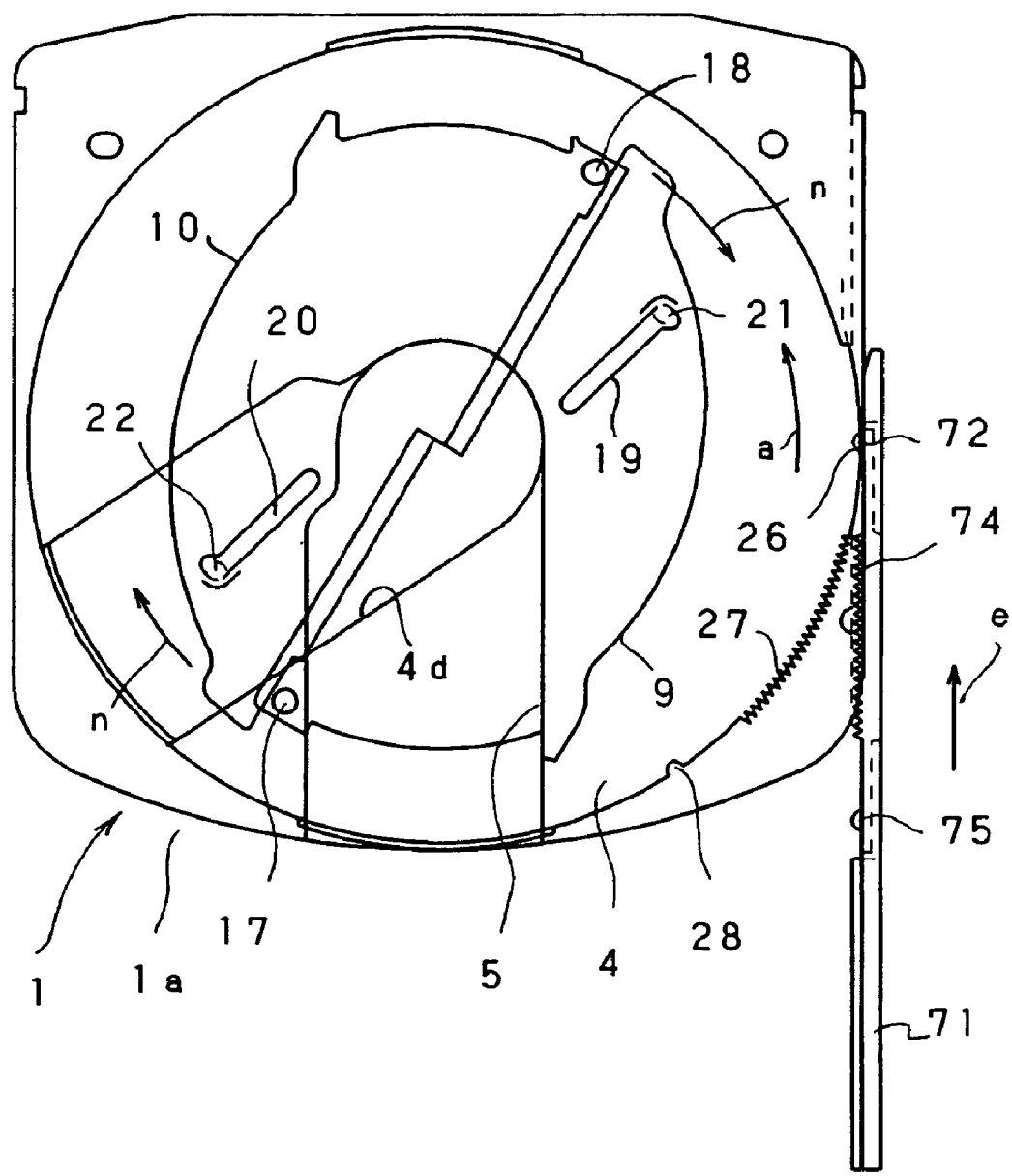
FIG. 29 is a see-through bottom view, showing the shutter opening operation of the inner rotor by the rack member, subsequent to the state shown in FIG. 28.
Figure 30:
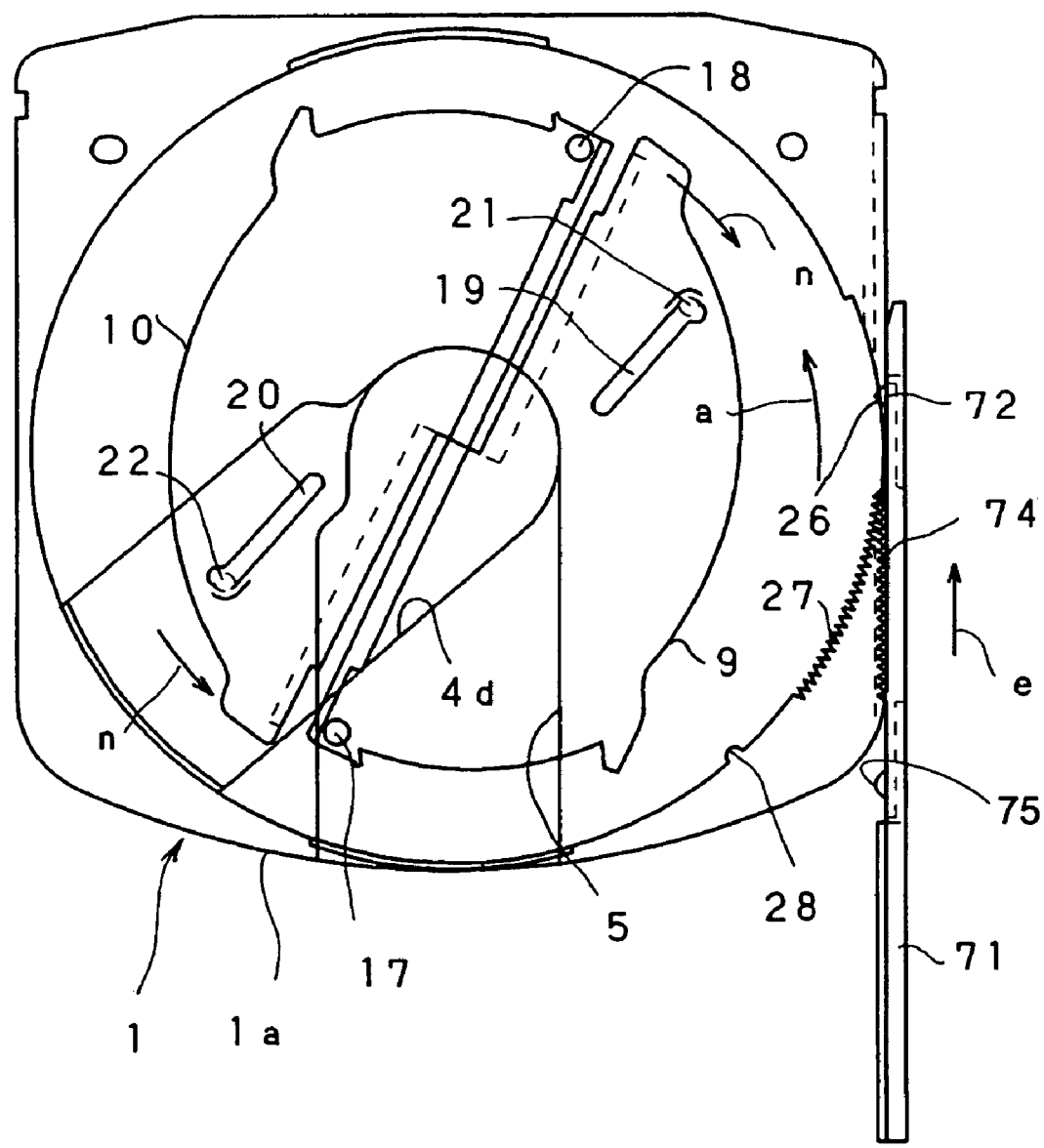
FIG. 30 is a see-through bottom view, showing the shutter opening operation by the rack member subsequent to the state shown in FIG. 29.
Figure 31:
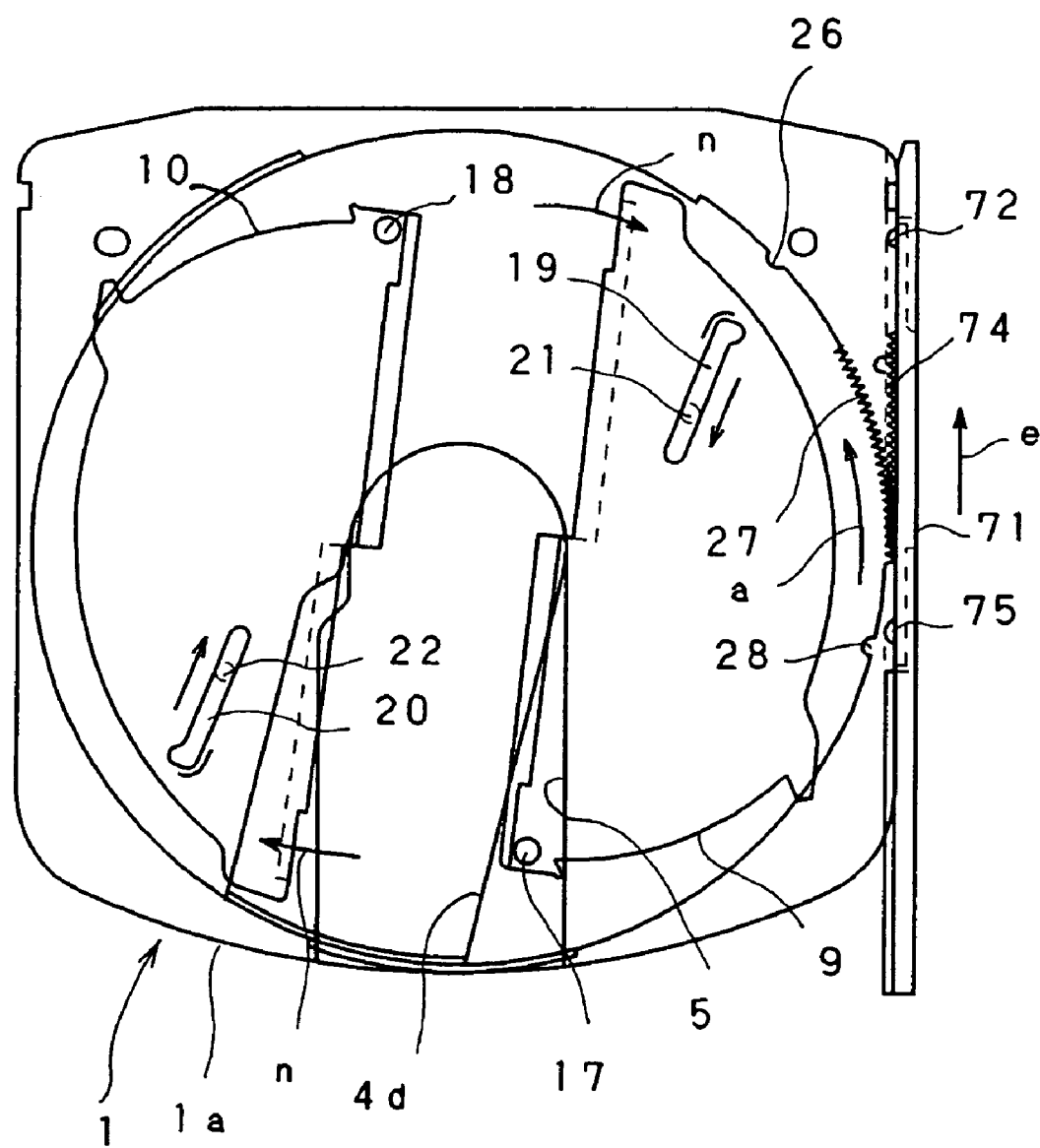
FIG. 31 is a see-through bottom view, showing the shutter opening operation by the rack member, subsequent to the state shown in FIG. 30.
Figure 32:
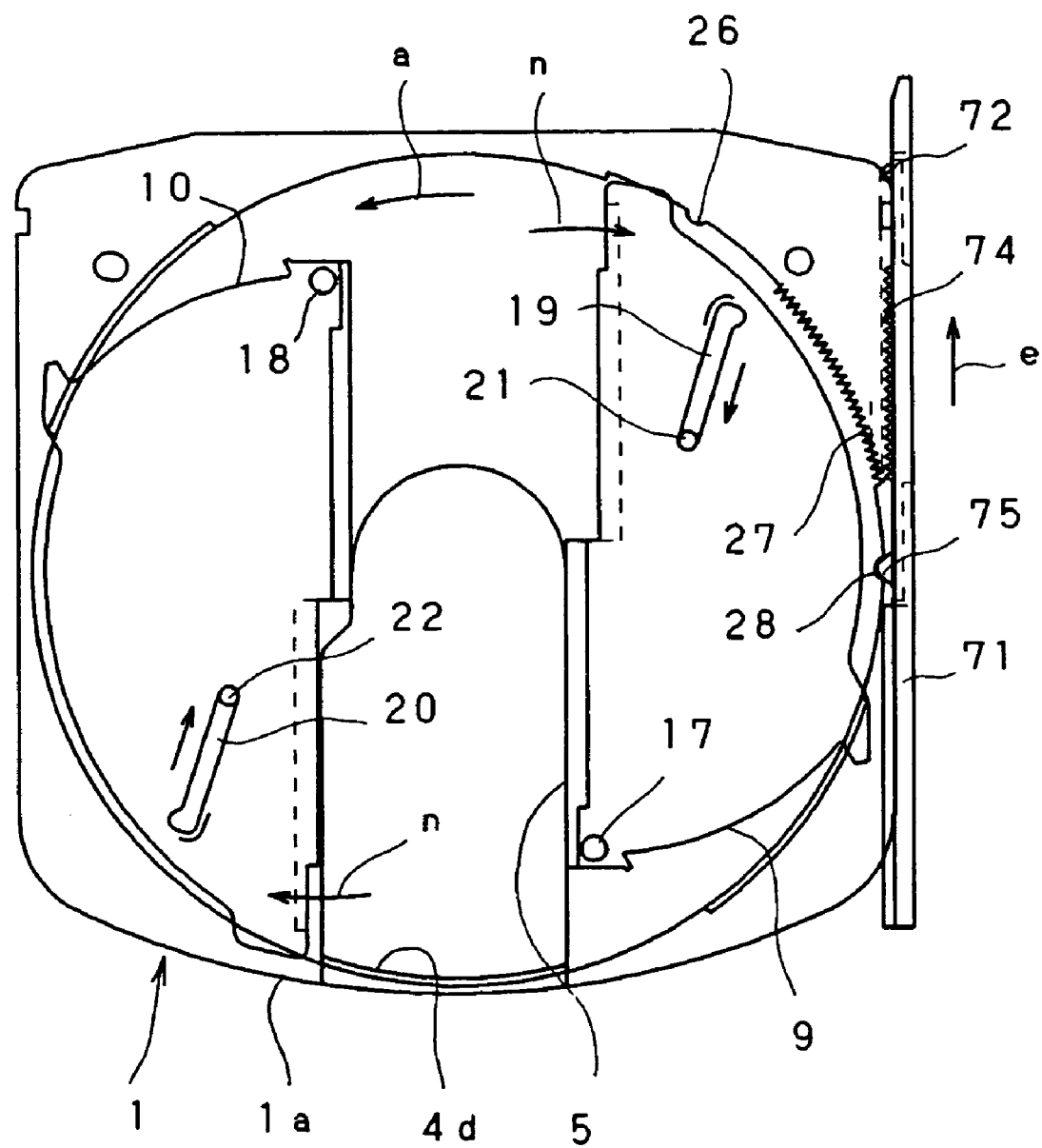
FIG. 32 is a see-through bottom view, showing the shutter opening operation by the rack member, subsequent to the state shown in FIG. 31.
Figure 33:
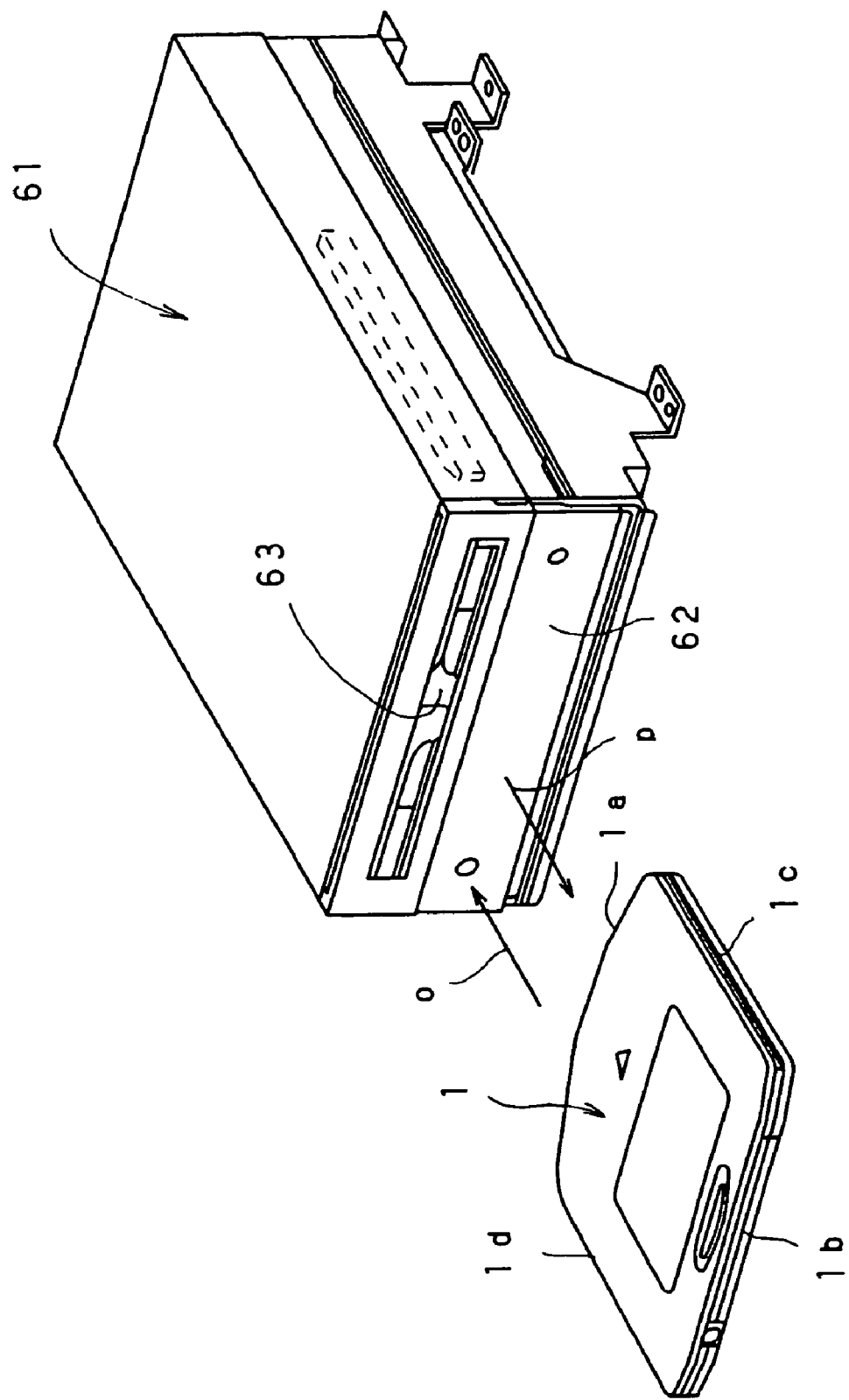
FIG. 33 is a perspective view showing the disc cartridge and a disc drive unit.

On the other hand, this shutter opening and closing mechanism 16, as shown in FIGS. 27 and 32, is such that, when the inner rotor 4 is rotated in the arrow a direction to the above-described shutter opening and closing position (=shutter open position), the pair of shutters 9 and 10 are rotated in the arrow n direction, which is the direction moving away from each other, around a pair of rotational support pins 17 and 18 due to a so-called cam operation by a pair of cum grooves 19 and 20 and cum pins 21 and 22 which are synchronized with a rotational operation, in the arrow a direction, of the pair of rotational support pins 17 and 18, and the pair of these shutters 9 and 10 are opened together to both side positions of the pick-up insertion slot 5.

At this time, the opening portion 4d of the inner rotor 4 completely overlaps the pick-up insertion slot 5, so that the entire area of this pick-up insertion slot 5 is completely opened.

Figure 25:
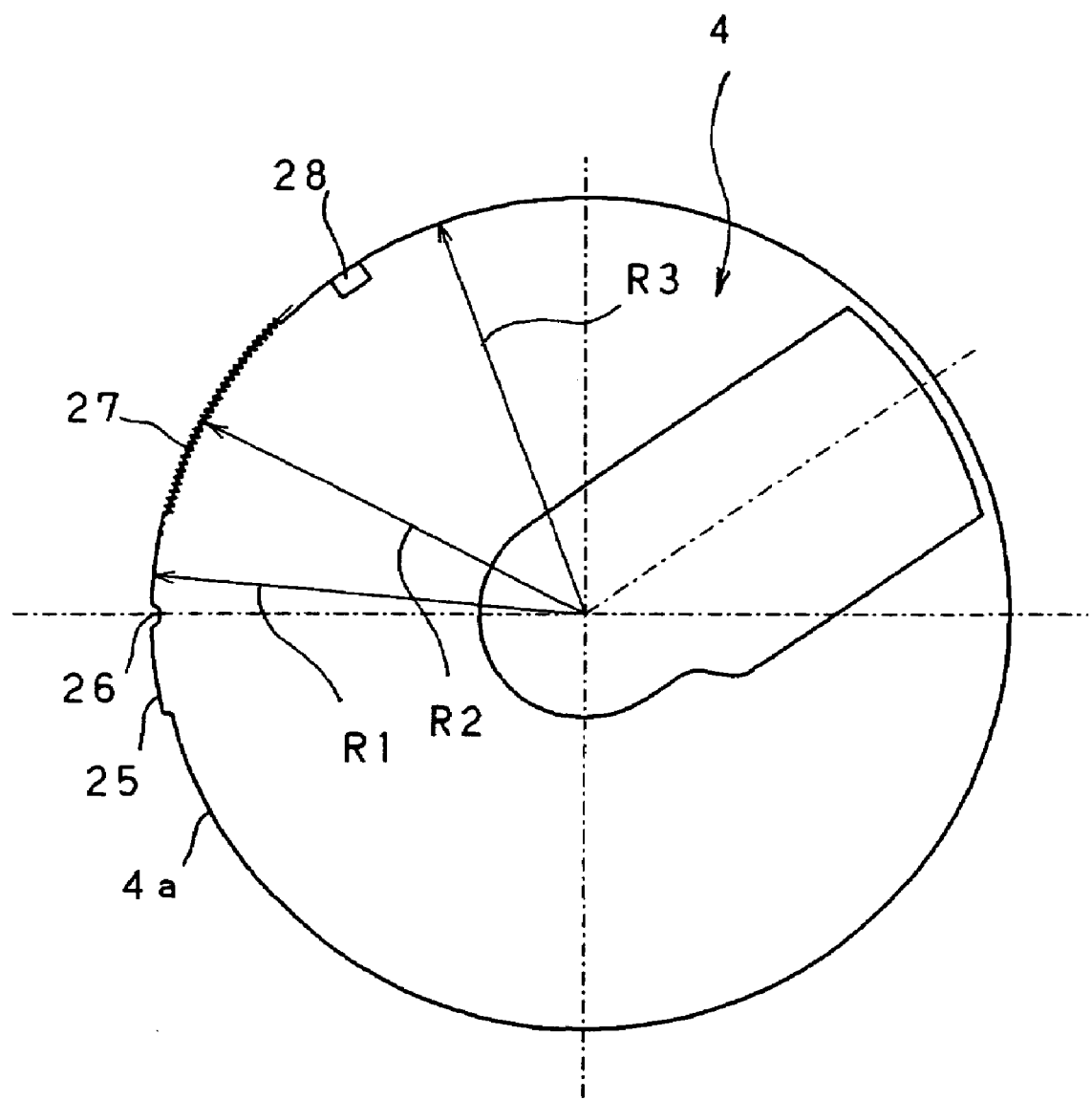
FIG. 25 is a bottom view of the inner rotor.

Note that FIG. 25 shows the layout of the shutter opening and closing start convex portion 25 of the outer periphery of the inner rotor 4, the shutter opening and closing start concave portion 26, the partial gear 27, and the shutter opening and closing termination concave portion 28. The shutter opening and closing start convex portion 25 is formed in a circular-arc shape with a maximum radius R1 of the inner rotor 4, and the partial gear 27 is formed in a circular-arc shape with an intermediate radius R2, in which the maximum radius R1 is inscribed, and the shutter opening and closing termination concave portion 28 is formed in the outer peripheral surface 4a with a minimum radius R3.

FIGS. 28 to 32, as described above, show a procedure in which the rack member 71 is relatively slidably driven in the arrow e direction along the one side surface (reference surface 33) 1c of the disc cartridge 1 and, when the inner rotor 4 is rotationally driven from the shutter opening and closing start position (=shutter closed position) shown in FIG. 28 to the shutter opening and closing termination position (=shutter open position) shown in FIG. 32 while the shutter opening and closing start convex portion 72, the rack portion 74, and the shutter opening and closing termination convex portion 75 are engaged and coupled, in this order, with the shutter opening and closing start concave portion 26, the partial gear 27, and the shutter opening and closing termination concave portion 28, the pair of shutters 9 and 10 are opened from the shutter closed position shown in FIG. 28 to the shutter open position shown in FIG. 32 by the cam operation of the shutter opening and closing mechanism 16.

Next, FIGS. 33 to 36 and so on show a disc drive unit 61, wherein the disc cartridge 1 is inserted inside a cartridge holder 64 in the arrow o direction from a slit-shaped cartridge loading slot 63 formed on the upper portion of a front panel 62, and a locking arm 67, which is locking means installed inside the cartridge holder 64, is engaged with a locking concave portion 13 formed in the other side surface 1d of the disc cartridge 1. This disc cartridge 1 is held inside the cartridge holder 64.

Figure 22:
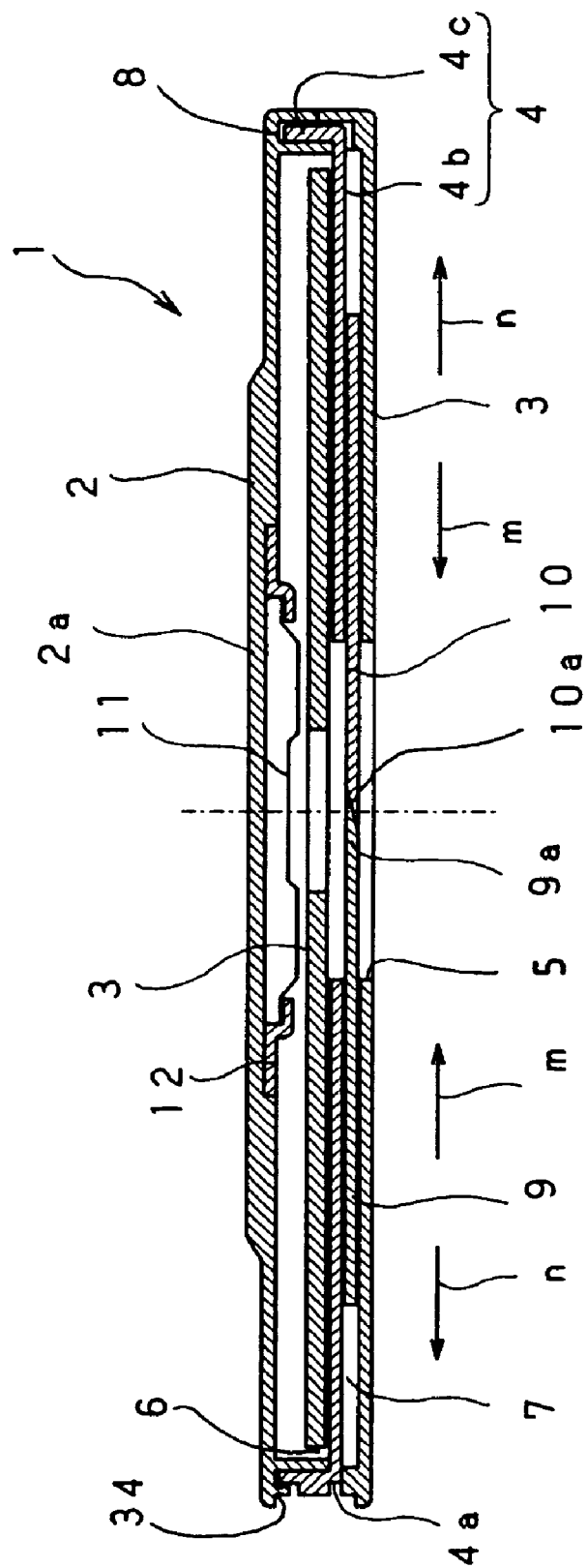
FIG. 22 is a sectional view of the disc cartridge along line B—B of FIG. 21.
Figure 23:
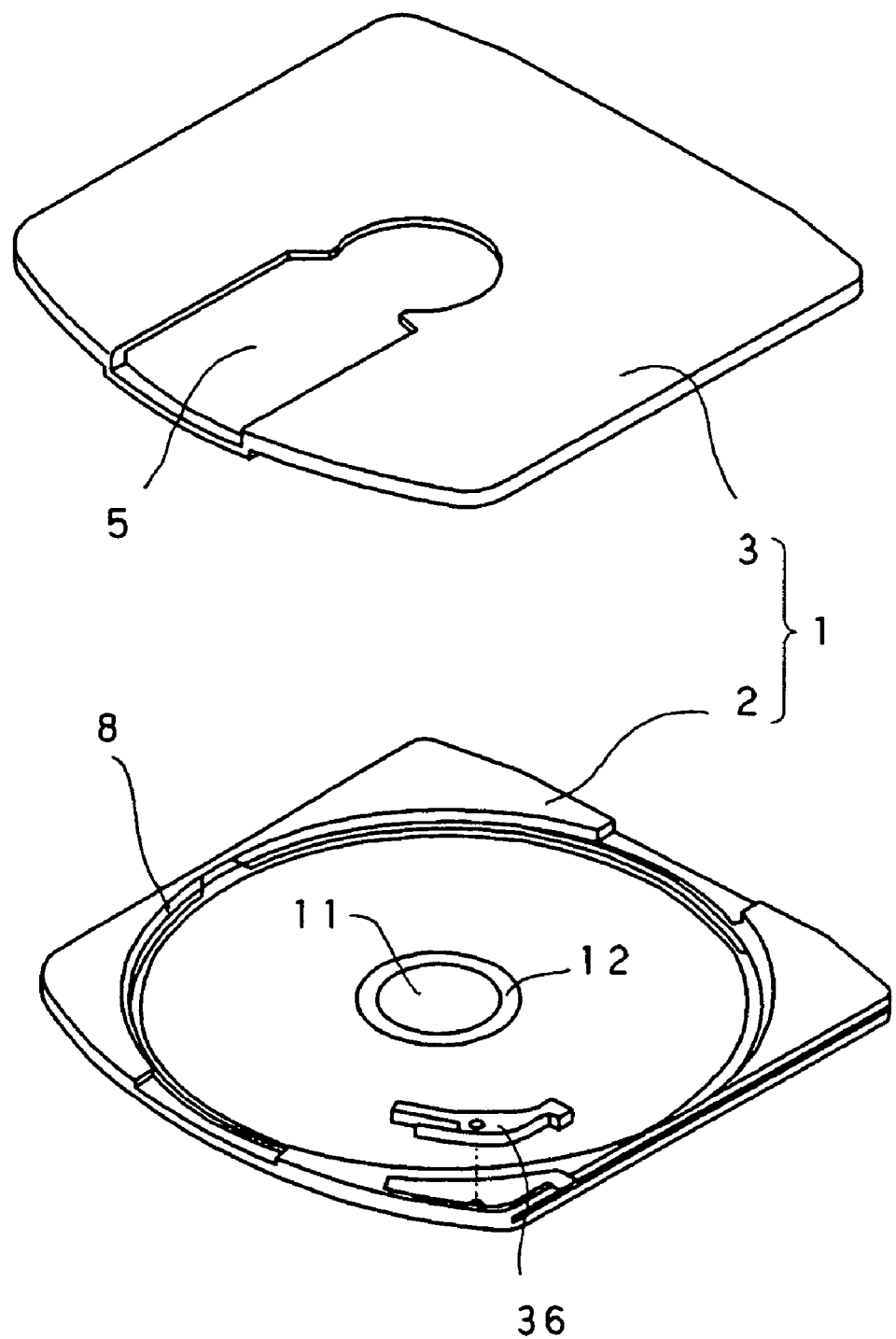
FIG. 23 is a bottom perspective view in which the upper and lower shells of the disc cartridge are disassembled.
Figure 24:
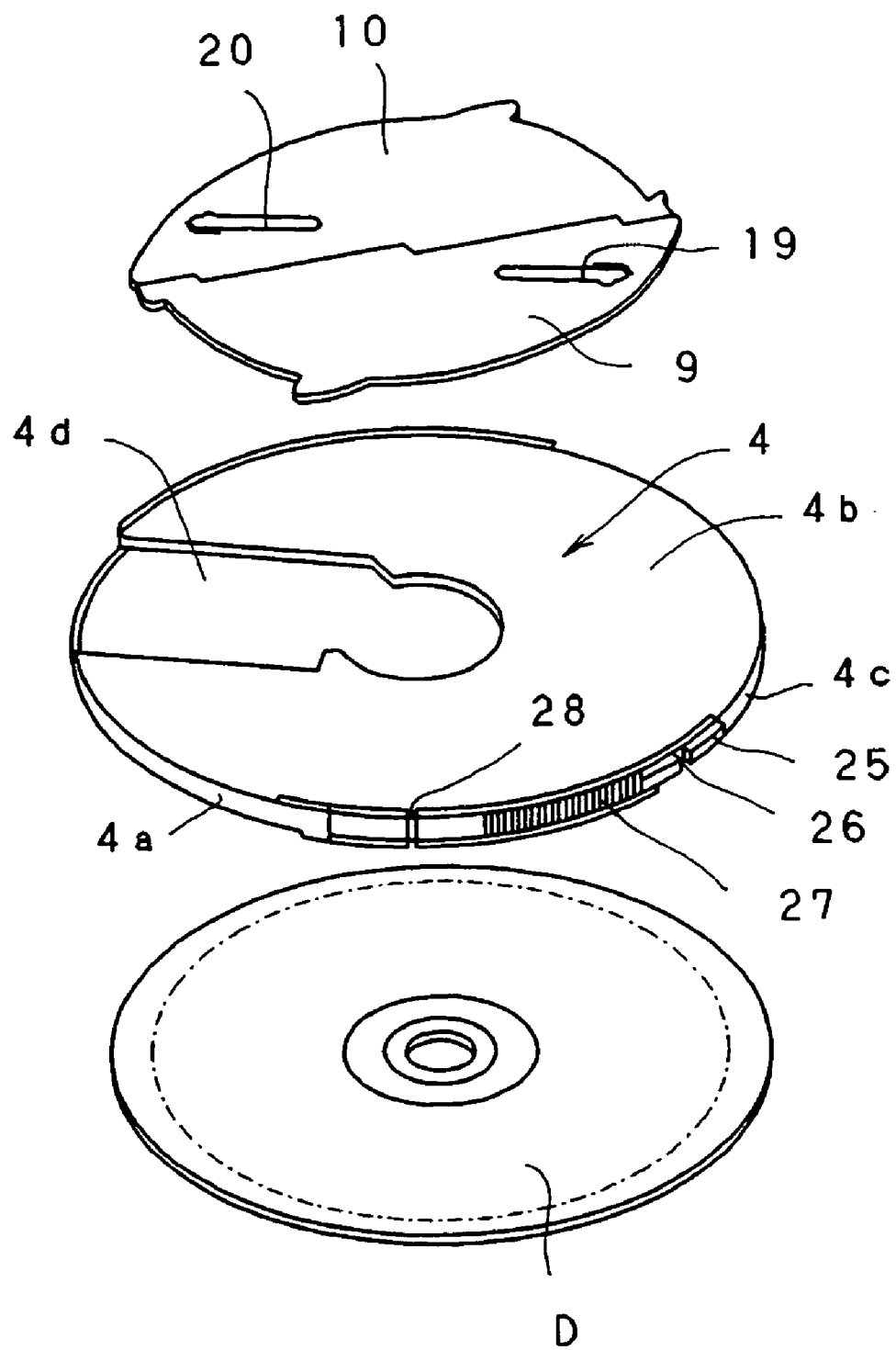
FIG. 24 is a bottom perspective view in which the inner rotor, the shutter, the disc of the disc cartridge are disassembled.

After that, the inner rotor 4 is rotationally driven by a sliding driving method of the rack member 71 to be described later, and the shutters 9 and 10 shown in FIG. 22 are opened in the arrow m direction.

After that, when the cartridge holder 64 is either lowered while remaining horizontal or horizontally retracted initially, then, is lowered while remaining horizontal and positioned, a disc table of a spindle motor, an optical pick-up and the like (none of which are shown) are relatively inserted inside the pick-up insertion slot 5 of the disc cartridge 1 from below. The disc D is raised to the intermediate position between the top and bottom of a disc housing portion 6 located at the inner rotor 4 and, at the same time, is centered and chucked on the disc table by the disc clamper 11.

The disc D is rotationally driven at a constant speed by the spindle motor, and writing and/or reading of data on the disc D is carried out by the optical pick-up and the like. The disc drive unit is thus constituted.

(7) Explanation Regarding a First Example of a Sliding Driving Method of the Rack Member in the Disc Drive Unit for the Disc Cartridge Next, referring to FIGS. 34 to 36, an explanation will be made regarding a first example of a sliding driving method of the rack member 71 for the disc cartridge 1. In this first example, as shown in FIGS. 34 and 35, when the disc cartridge 1 is inserted into the cartridge holder 64 inside of the cartridge drive unit 61 from the arrow o direction and the locking concave portion 13 is locked by the locking arm 67 and the insertion of the disc cartridge 1 into the cartridge holder 64 is detected by a cartridge insertion sensor (not shown), the rack member 71 is slidably driven in the arrow e direction by a rack driving motor 81, which is rack driving means, from a shutter opening and closing start position P11 shown in FIG. 35 to a shutter opening and closing termination position P12 shown in FIG. 36 along the above described reference surface 33 of the disc cartridge 1. Then, as described above, the inner rotor 4 is rotationally driven in the arrow a direction so as to perform a shutter opening operation. Thus, the first example of the sliding driving method of the rack member is constituted.

Note that, subsequent to writing to and/or reading from the disc D, the rack member 71 is slidably driven by the rack drive motor 81 in the arrow f direction from the shutter opening and closing termination position P12 shown in FIG. 36 to the shutter opening and closing start position P11 shown in FIG. 35 and, as described above, the inner rotor 4 is rotationally driven in the arrow b direction so as to perform a shutter closing operation. After that, as shown in FIG. 34, the disc cartridge 1 is ejected in the arrow p direction from the cartridge loading slot 63 to the outside of the disc drive unit 61.

Hence, as described above, when the pick-up insertion slot 5 of the disc cartridge 1 is blocked by the shutter, the disc cartridge 1 can be ejected from the disc drive unit 61 and, therefore, no dust can get inside the disc cartridge 1.

According to this first example, simply by keeping the disc cartridge 1 fixed in position (positioned) to the cartridge holder 64 and merely slidably-driving the rack member 71 alone inside a small space can rotationally drive the inner rotor 4 to perform the shutter opening operation and, therefore, the disc drive unit 61 can be reduced in size. Further, since it is enough to drive the rack member 71, the mechanism can be made simple and cost reduction can be achieved.

Figure 37:
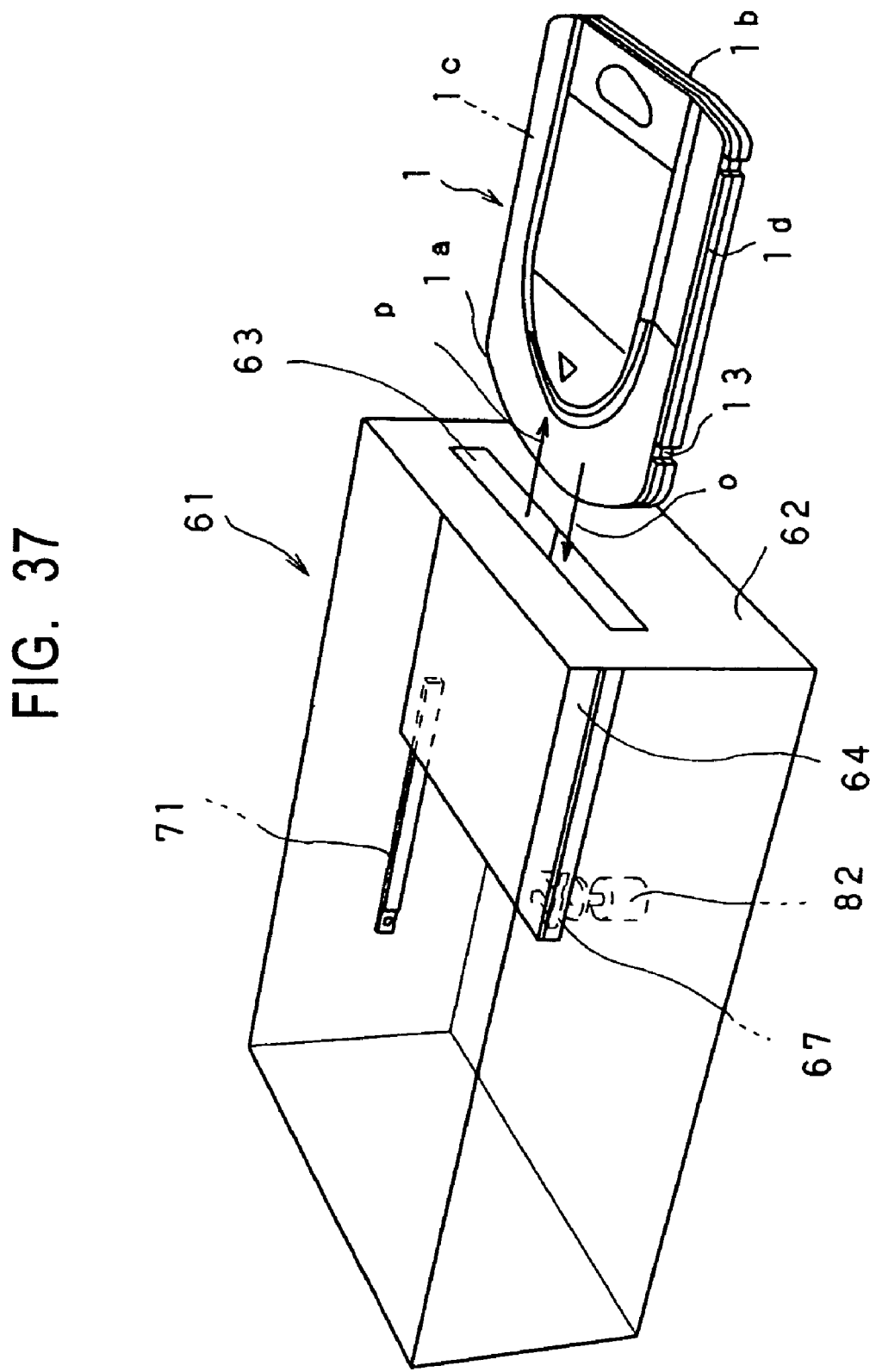
FIG. 37 is a see-through perspective view, showing the initial state of a second example of a relative sliding driving method of the rack member for the disc cartridge which performs shutter opening and closing driving of the disc cartridge.
Figure 38:
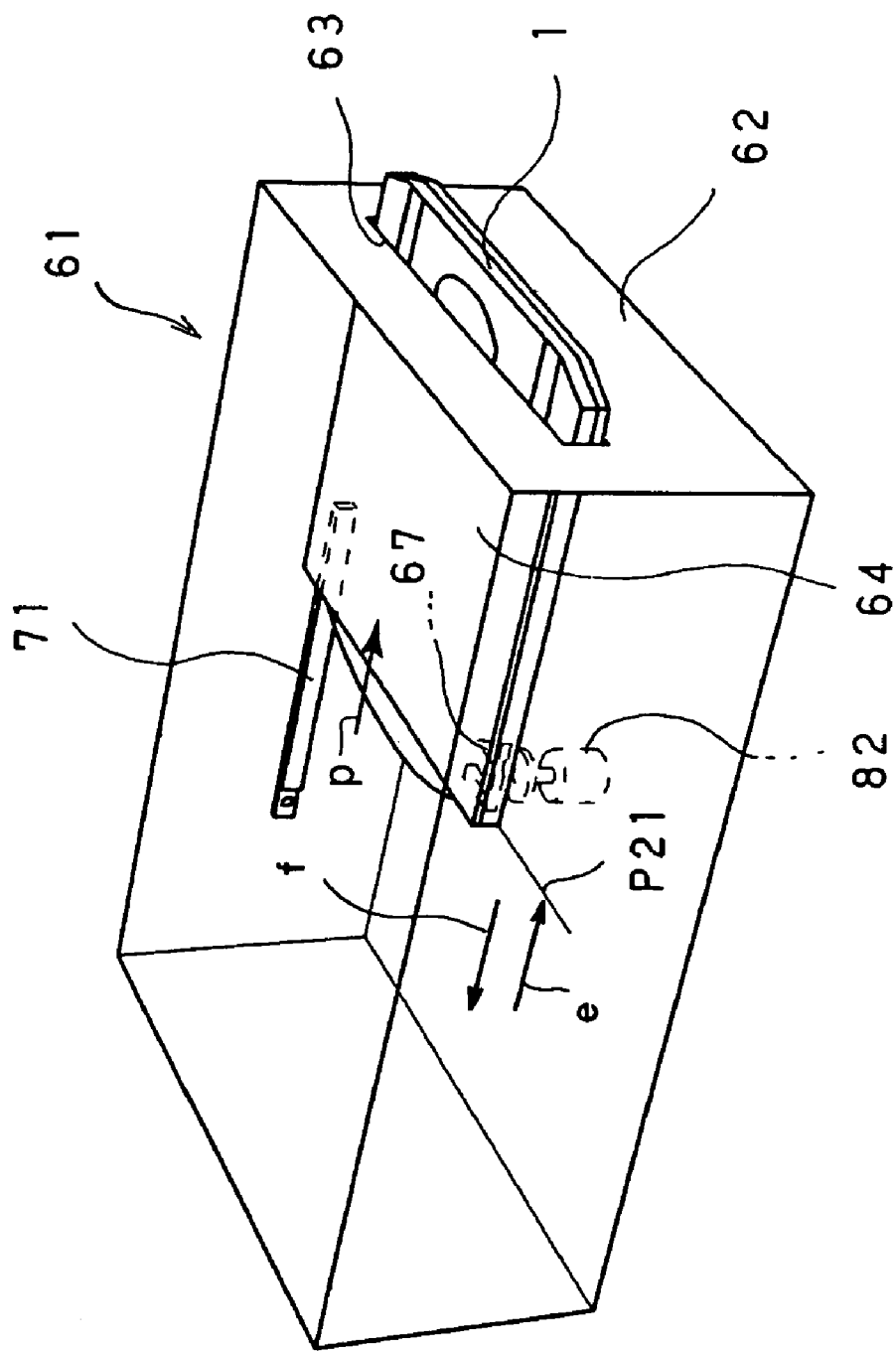
FIG. 38 is a see-through perspective view, showing the second example of the relative sliding driving method of the rack member for the disc cartridge subsequent to the state shown in FIG. 37.

(8) Explanation Regarding a Second Example of the Sliding Driving Method of the Rack Member in the Disc Drive Unit for the Disc Cartridge Next, referring to FIGS. 37 to 40, an explanation will be made regarding the second example of the sliding driving method of the rack member 71 for the disc cartridge 1. In this second example, when the rack member 71 is fixed in position inside the disc drive unit 61 and, as shown in FIGS. 37 and 38, the disc cartridge 1 is inserted inside the cartridge holder 64 inside the disc drive unit 61 from the arrow o direction so that the locking concave portion 13 is locked by the locking arm 67 and the insertion of the disc cartridge 1 into the cartridge holder 64 is detected by the cartridge insertion sensor (not shown), the cartridge holder 64 is slidably driven with the disc cartridge 1 by the cartridge holder driving motor 82, which functions as cartridge holder driving means, in the arrow f direction in parallel with the rack member 71, from a shutter opening and closing start position P21 shown in FIG. 38 to a shutter opening and closing termination position P22 shown in FIG. 40. Then, as described above, the rack member 71 is slidably driven in the arrow e direction relative to the disc cartridge 1 and the inner rotor 4 is rotationally driven in the arrow a direction to perform the shutter opening operation. The second example of the sliding driving method of the rack member is thus realized.

Figure 39:
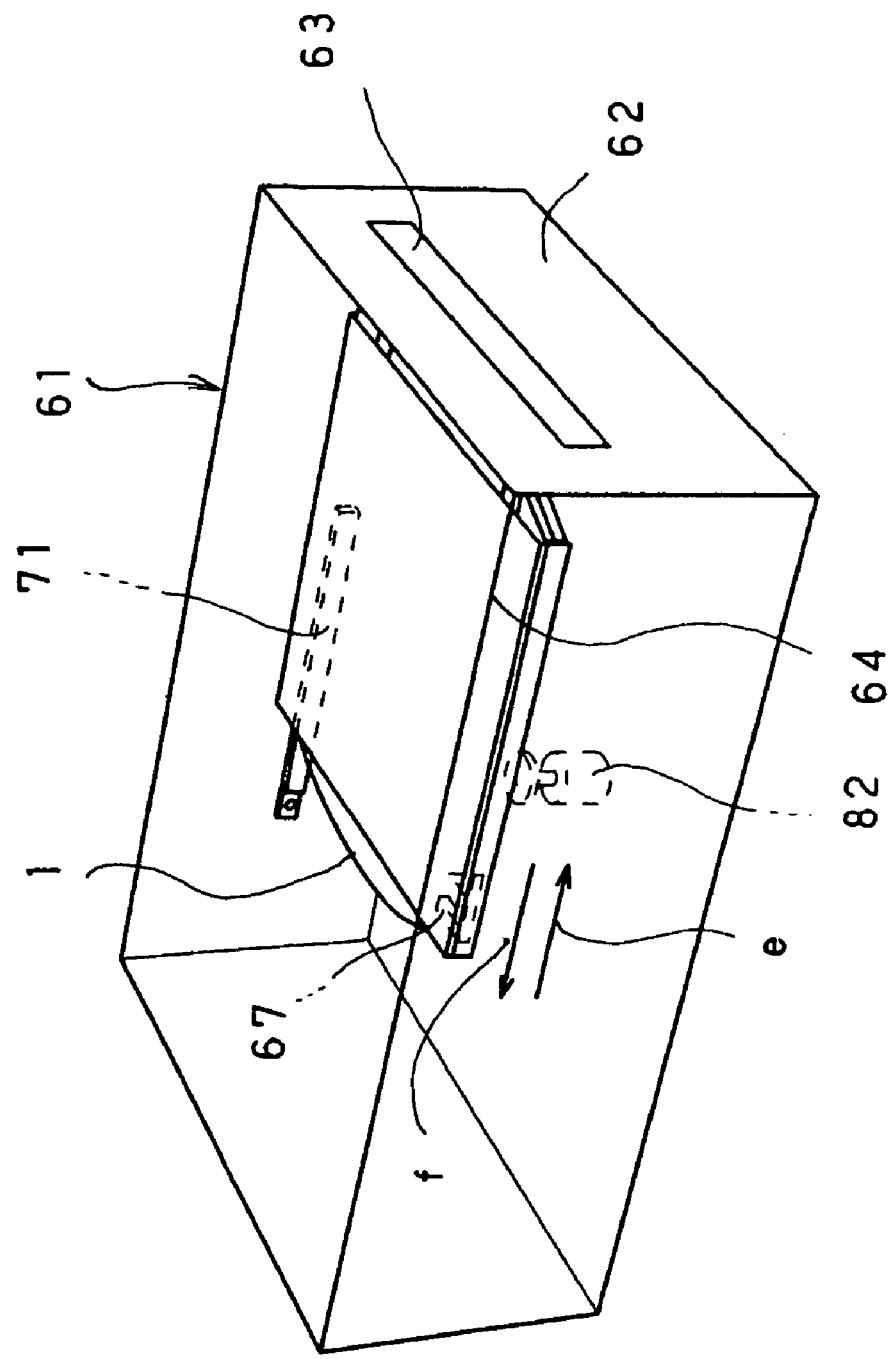
FIG. 39 is a see-through perspective view, showing the second example of the relative sliding driving method of the rack member for the disc cartridge subsequent to the state shown in FIG. 38.
Figure 40:
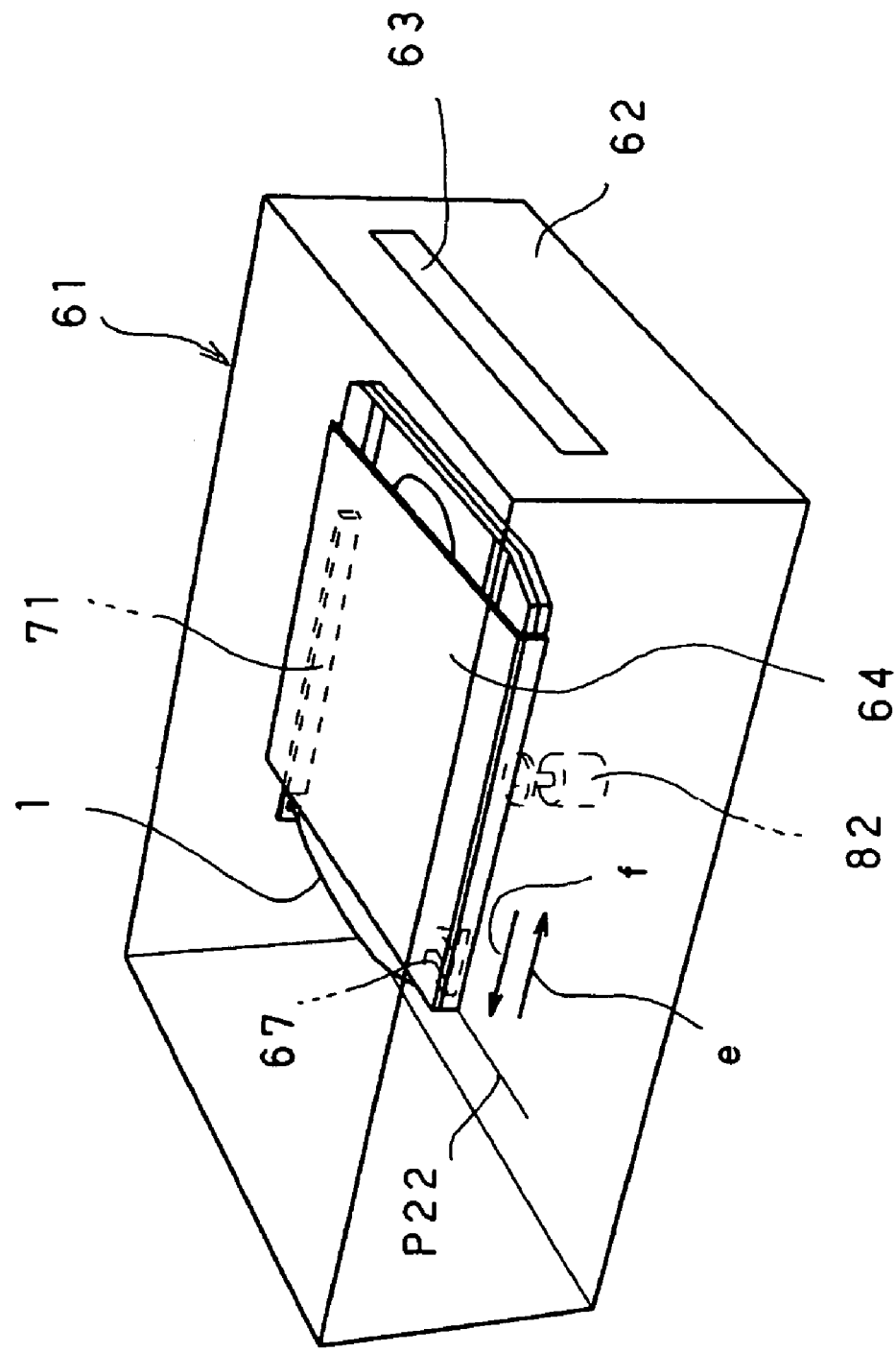
FIG. 40 is a see-through perspective view, showing the second example of the relative sliding driving method of the rack member for the disc cartridge subsequent to the state shown in FIG. 39.

Note that, subsequent to writing to and/or reading from the disc D, the cartridge holder 64 is slidably driven with the disc cartridge 1 by the cartridge holder driving motor 82 in the arrow e direction from the shutter opening and closing termination position P22 shown in FIG. 40 to the shutter opening and closing start position P21 shown in FIG. 38 and, as described above, the inner rotor 4 is rotationally driven in the arrow b direction so as to perform the shutter closing operation. After that, as shown in FIGS. 38 and 39, the disc cartridge 1 is ejected from the cartridge loading slot 63 in the arrow p direction to the outside of the disc drive unit 61.

According to this first example, the cartridge holder 64 is suitable for the disc drive unit 61 which moves the cartridge holder 64 along an L-shaped track that horizontally takes the cartridge holder 64, in the arrow f direction, from the cartridge insertion position shown in FIG. 37 and, after that, lowers it vertically. It is enough to fix the rack member 71 in position and, since there is no need to provide a sliding driving mechanism of this rack member 71, the structure can be simplified and the cost can be reduced.

(9) Explanation Regarding a Third Example of the Sliding Driving Method of the Rack Member in the Disc Drive Unit for the Disc Cartridge Next, referring to FIGS. 41 to 43, an explanation will be made regarding a third example of the sliding driving method of the rack member 71 for the disc cartridge 1. This third example is a combination of the sliding driving of the rack member 71 in the above described first example and the sliding driving of the cartridge holder 64 in the second example.

That is, as shown in FIGS. 41 and 42, when the disc cartridge 1 is inserted into the cartridge holder 64 inside the disc drive unit 61 from the arrow o direction and the locking concave portion 13 is locked by the locking arm 67 and the insertion of the disc cartridge 1 into the cartridge holder 64 is detected by the cartridge sensor (not shown), the rack member 71 is slidably driven by the rack drive motor 81 in the arrow e direction from the shutter opening and closing start position P11 shown in FIG. 42 to the shutter opening and closing termination position P12 shown in FIG. 43. Simultaneously with this, the cartridge holder 64 is slidably driven together with the disc cartridge 1 by the cartridge holder motor 82 in the arrow f direction from the shutter opening and closing start position P21 shown in FIG. 42 to the shutter opening and closing termination position P22 shown in FIG. 42. Hence, by a sliding stroke which is the sum of a sliding stroke in the arrow e direction of the rack member 71 and a sliding stroke in the arrow f direction of the cartridge holder 64, the rack member 71 is slidably driven in the arrow e direction relative to the disc cartridge 1 by a predetermined stroke. Then, as described above, the inner rotor 4 is rotationally driven rapidly in the arrow a direction, and the shutter opening operation is rapidly performed. The third example of the sliding movement of the rack member is thus realized.

Note that, subsequent to writing to and/or reading from the disc D, the rack member 71 is slidably driven by the rack driving motor 81 in the arrow f direction from the shutter opening and closing termination position P12 shown in FIG. 43 to the shutter opening and closing start portion P11 shown in FIG. 42 and, at the same time, the cartridge holder 64 is also slidably driven in the arrow e direction from the shutter opening and closing termination position P22 shown in FIG. 43 to the shutter opening and closing start position P21 shown in FIG. 42 so as to perform the shutter closing operation. After that, as shown in FIGS. 42 and 41, the disc cartridge 1 is ejected from the cartridge loading slot 63 in the arrow p direction to the outside of the disc drive unit 61.

According to this third example, by a sliding stroke which is the sum of a sliding stroke of the rack member 71 in the arrow e direction relative to the disc cartridge 1 and the slide stroke of the cartridge 1 in the arrow f direction relative to the rack member 71, the inner rotor 4 is slidably driven so as to perform the shutter opening and closing operation. Hence, each sliding stroke of the rack member 71 and the disc cartridge 1 can be reduced to one half that of the above-described first and second examples and a reduction in the overall size is thus possible. The sliding driving time of the rack member 71 or the disc cartridge 1 can be also shorten to one half that of the first and the second examples and, therefore, a shortening of the loading and unloading time of the disc cartridge 1 into and from the cartridge drive unit 61 can be realized.

While the embodiments of the present invention have been thus described, it will be understood that the present invention is not limited to the above-described embodiments, but various modifications are possible within the scope and spirit of the present invention.

For example, the disc cartridge 1 of the present invention is applicable also to disc cartridges called as caddies, which are constituted such that the whole or the part of the upper shell 2 can be opened and closed with respect to the lower shell 3 so as to house the disc D inside the disc housing portion 6 in such a manner that it can be removed in a removable manner.

INDUSTRIAL APPLICABILITY

The disc drive unit of the present invention thus constituted is effective in realizing the following advantages.

The present invention can perform the opening and closing driving of the shutter by a simple structure by rotation of the inner rotor since the opening and closing driving of the shutter by rotation of the inner rotor in the disc cartridge, which opens and closes the pick-up insertion slot with the shutter from the inside by rotation of the inner rotor in which the disc-shaped recording medium is housed, can be simply performed by the rack member which rotationally drives the outer peripheral gear of the inner rotor with the rack portion so that the shutter cannot be easily opened from the outside.

The present invention comprises locking means for locking the disc cartridge inserted into the cartridge holder in place inside of the cartridge holder, and rack driving means for rotationally driving the inner rotor by the rack portion by slidable-driving the rack member along the side surface of the disc cartridge; therefore, by reducing the space required, the size can be reduced.

The present invention comprises lock means for locking the disc cartridge inserted into the cartridge holder in place inside of the cartridge holder, and cartridge holder driving means for rotationally driving the inner rotor with the rack portion by slidable-driving the cartridge holder with respect to the rack member, which is fixed in position; therefore, the structure is made simple and cost reduction can be realized.

The present invention comprises lock means for locking the disc cartridge inserted into the cartridge holder in place inside of the cartridge holder, rack driving means for slidably-driving the rack member in one direction with respect to the cartridge holder along the side surface of the disc cartridge, and cartridge holder driving means for slidably-driving the cartridge holder in the other direction almost simultaneously with the sliding driving of the rack portion with the rack driving means, wherein, by sliding strokes in two directions, including sliding in one direction with respect to the disc cartridge of the rack member and sliding in another direction with respect to the rack member of the disc cartridge, the inner rotor is rotationally driven with the rack portion and, therefore, compactness can be realized and a shortening of the time for loading and unloading the disc cartridge can be realized.

The invention claimed is:

1. A disc drive unit for writing to and/or reading from a disc-shaped recording medium, which is rotatably housed inside a disc cartridge including a rotatably-housed inner rotor and a shutter which opens and closes a pick-up insertion slot from the inside by rotation of the inner rotor, said disc drive unit comprising: a rack member having a rack portion engaging with an outer peripheral gear formed on an outer periphery of said inner rotor; and driving means for slidably-driving said rack member with respect to said disc cartridge so as to rationally drive said outer peripheral gear; and a cartridge holder into which said disc cartridge is inserted; and locking means for locking said cartridge holder inserted into said cartridge holder in place inside the cartridge holder, wherein said driving means slidably drives said cartridge holder with respect to said rack member, which is fixed in position, so as to rotationally drive said inner rotor by means of said rack member.

2. The disc drive unit according to claim 1, further comprising; a cartridge holder into which said disc cartridge is inserted; and locking means for locking said cartridge holder inserted into said cartridge holder in place inside the cartridge holder, wherein said driving means slidably drives said rack member along a side surface of said disc cartridge so as to rotationally drive said inner rotor by means of said rack portion.

3. The disc drive unit according to claim 1, further comprising: a cartridge holder into which said disc cartridge is inserted; and locking means for locking said cartridge holder inserted into said cartridge holder in place inside the cartridge holder; wherein said driving means comprises such that it includes: rack driving means for slidably-driving said rack member in one direction with respect to said cartridge holder along a side surface of said disc cartridge; and cartridge holder driving means for slidably-driving said cartridge holder in the other direction simultaneously with the sliding driving of said rack member by said rack driving means; wherein, said inner rotor is rotationally driven by means of said rack portion by the sliding strokes in two directions, including sliding in one direction with respect to said disc cartridge of said rack member and sliding in another direction with respect to said rack member of said disc cartridge.

* * * * *

UNITED STATES PATENT AND TRADEMARK OFFICE
CERTIFICATE OF CORRECTION

PATENT NO. : 7,231,646 B2  Page 1 of 1
APPLICATION NO. : 10/433070
DATED : June 12, 2007
INVENTOR(S) : Mitsuyoshi Kawaguchi et al.

It is certified that error appears in the above-identified patent and that said Letters Patent is hereby corrected as shown below:

Column 12, Lines 58, 60, and 62, change "damper" to --clamper--.

Signed and Sealed this

Seventeenth Day of June, 2008

JON W. DUDAS
*Director of the United States Patent and Trademark Office*